United States Patent
Tamatsu

(10) Patent No.: US 9,677,539 B2
(45) Date of Patent: Jun. 13, 2017

(54) VERTICAL AXIS WATER/WIND TURBINE MOTOR USING FLIGHT FEATHER OPENING/CLOSING WING SYSTEM

(71) Applicant: Yoshiji Tamatsu, Okinawa (JP)

(72) Inventor: Yoshiji Tamatsu, Okinawa (JP)

(*) Notice: Subject to any disclaimer, the term of this patent is extended or adjusted under 35 U.S.C. 154(b) by 0 days.

(21) Appl. No.: 14/893,652

(22) PCT Filed: May 24, 2014

(86) PCT No.: PCT/JP2014/063758
§ 371 (c)(1),
(2) Date: Nov. 24, 2015

(87) PCT Pub. No.: WO2014/192664
PCT Pub. Date: Dec. 4, 2014

(65) Prior Publication Data
US 2016/0123300 A1 May 5, 2016

(30) Foreign Application Priority Data

May 25, 2013 (JP) .................. 2013-110457
Nov. 11, 2013 (JP) .................. 2013-233167

(51) Int. Cl.
*F03D 3/02* (2006.01)
*F03D 3/06* (2006.01)
(Continued)

(52) U.S. Cl.
CPC ............ *F03D 3/067* (2013.01); *F03B 17/065* (2013.01); *F03D 3/02* (2013.01); *F03D 3/068* (2013.01);
(Continued)

(58) Field of Classification Search
CPC .......... F03D 3/062; F03D 3/067; F03D 3/068; F05B 2210/16; F05B 2240/232;
(Continued)

(56) References Cited

U.S. PATENT DOCUMENTS 1,076,713 A * 10/1913 Southwick ............. F03D 3/067
416/119
4,274,011 A 6/1981 Garfinkle
(Continued)

FOREIGN PATENT DOCUMENTS

DE 102008027241 A1 12/2008
FR 2966094 A1 4/2012
(Continued)

OTHER PUBLICATIONS

International Search Report for PCT/JP2014/063758 dated Jul. 1, 2014.
(Continued)

*Primary Examiner* — Ninh H Nguyen
(74) *Attorney, Agent, or Firm* — Pearne & Gordon LLP

(57) ABSTRACT

A stability of a vertical axis combined water/wind turbine motor composed of a drag type and a lift type is improved by releasing convex surface resistance produced by a drag-type blade going against a fluid and increasing rotation torque by the reduction in resistance; during high-speed rotation equal to or higher than a fluid speed, all wing surfaces of the drag type are naturally brought into a released state as a result of being pulled by the lift-type blade rotation speed; and a danger at the time of increasing a fluid speed can be avoided by producing a fully-released state by rolling in feathers of a drag-type wind surface configuration, by decreasing the entire volume by folding wing surfaces to the rotation axis side, or by decreasing the entire structure by drawing feathers on the wing surface toward the rotation center.

10 Claims, 13 Drawing Sheets

(51) Int. Cl.
*F03D 7/06* (2006.01)
*F03B 17/06* (2006.01)

(52) U.S. Cl.
CPC ............ *F03D 7/06* (2013.01); *F05B 2210/16* (2013.01); *F05B 2240/211* (2013.01); *F05B 2240/214* (2013.01); *F05B 2240/232* (2013.01); *F05B 2240/312* (2013.01); *F05B 2240/313* (2013.01); *Y02E 10/223* (2013.01); *Y02E 10/28* (2013.01); *Y02E 10/74* (2013.01)

(58) Field of Classification Search
CPC .......... F05B 2240/231; F05B 2240/211; F05B 2250/711; F05B 2250/712; Y02E 10/223; Y02E 10/74
See application file for complete search history.

(56) References Cited

U.S. PATENT DOCUMENTS

| | | | | |
|---|---|---|---|---|
| 8,864,440 | B2* | 10/2014 | Sauer, Jr. | F03D 3/065 415/4.2 |
| 9,011,096 | B2* | 4/2015 | Su | F03D 3/02 416/111 |
| 2008/0273974 | A1 | 11/2008 | Becker | |
| 2010/0233919 | A1* | 9/2010 | Ersoy | B63H 9/02 440/8 |
| 2011/0042962 | A1* | 2/2011 | Yoon | F03D 3/061 290/55 |
| 2012/0003092 | A1* | 1/2012 | Yan | F03D 3/067 416/100 |
| 2013/0136600 | A1 | 5/2013 | Tamatsu | |

FOREIGN PATENT DOCUMENTS

| | | |
|---|---|---|
| JP | S54-093740 A | 7/1979 |
| JP | S56-143367 A | 11/1981 |
| JP | 61-237885 A | 10/1986 |
| JP | H07-208320 A | 8/1995 |
| JP | H11-294313 A | 10/1999 |
| JP | 3224023 A | 10/2000 |
| JP | 2001-193629 A | 7/2001 |
| JP | 2004-293409 A | 10/2004 |
| JP | 2004-301088 A | 10/2004 |
| JP | 2004-332701 A | 11/2004 |
| JP | 3538816 A | 11/2004 |
| JP | 4488697 A | 1/2005 |
| JP | 2005-054757 A | 3/2005 |
| JP | 2005-83206 A | 3/2005 |
| JP | 2005-133550 A | 5/2005 |
| JP | 4354773 A | 5/2005 |
| JP | 4727277 A | 10/2006 |
| JP | 2007-40239 A | 2/2007 |
| JP | 2007-40276 A | 2/2007 |
| JP | 2008-309132 A | 12/2008 |
| JP | 4753399 B1 | 8/2011 |
| JP | 2012-17729 A | 1/2012 |
| JP | 3177735 U | 8/2012 |
| WO | 2009084992 A1 | 7/2009 |

OTHER PUBLICATIONS

Microfilm of the specification and drawings annexed to the request of Japanese Utility Model Application No. 113319/1980 (Laid-open No. 35472/1982), Mitsubishi Electric Corp., Feb. 24, 1982, specification, p. 7, line 10 to the last line, fig. 5.

* cited by examiner

VERTICAL AXIS WATER/WIND TURBINE MOTOR USING FLIGHT FEATHER OPENING/CLOSING WING SYSTEM

FIELD OF THE INVENTION

The present invention relates to a vertical axis water/wind turbine motor, a technique of avoiding a danger to a drag-type water/wind turbine motor having a flight feather opening/closing wing system, which rotates by drag after receiving force from a fluid, and a technology for a combined water/wind turbine motor provided with a wing on the circumferential circle side of the drag-type water/wind turbine motor, wherein the wing is rotated by lift.

BACKGROUND OF THE INVENTION

A paddle type and a Savonius type that are known as representative examples of vertical axis drag-type wind turbines directly receives force of a fluid in a holding manner on a wing receiving surface, which is approximately a vertical surface relative to the incoming direction of the fluid, and therefore although the advantage is that movability is good because rotation can be started at a low wind-speed area, and large torque can be produced, it is not possible to attain a rotation speed of a wind turbine equal to or higher than a wind speed and also they are not suitable for converting high energy generated at a high wind-speed area into a rotation energy with high efficiency.

In order to enhance the initial startability of a lift-type wind turbine, which is believed to be poor at startability, a combined water/wind turbine in which a Savonius-type drag-type blade is mounted on the inner rotation side of a Darrieus-type lift-type wind turbine blade have been developed and utilized, wherein the technology is characterized in that the wind turbine has been improved so that rotation is made possible from low fluid-speed areas to high fluid-speed areas.

As a combined water/wind turbine motor, there is also a technology that has improved startability by mounting a drag-type cross flow blade on the inner side of a linear wing surface on the circumferential side and has also improved the rotation efficiency by mounting the cross flow blade in such a manner that a fluid hitting the cross flow blade flows along the blade and effectively hits a lift-type blade.

PRIOR ART DOCUMENTS

Patent Documents

Patent Document 1: Japanese Patent Application Kokai Publication No. S54-093740
Patent Document 2: Japanese Patent Application Kokai Publication No. S56-143367
Patent Document 3: Japanese Patent Application Kokai Publication No. H07-208320
Patent Document 4: Japanese Patent Application Kokai Publication No. H11-294313
Patent Document 5: Japanese Patent Application Kokai Publication No. 2004-293409
Patent Document 6: Japanese Patent Application Kokai Publication No. 2005-054757
Patent Document 7: Japanese Patent Application Kokai Publication No. 2005-83206
Patent Document 8: Japanese Patent Application Kokai Publication No. 2007-40239
Patent Document 9: Japanese Patent Application Kokai Publication No. 2007-40276
Patent Document 10: Japanese Patent No. 4727277
Patent Document 11: Japanese Patent No. 4354773
Patent Document 12: Japanese Patent Application Kokai Publication No. 2001-193629
Patent Document 13: Japanese Patent Application Kokai Publication No. 2004-332701
Patent Document 14: Japanese Patent Application Kokai Publication No. 2008-309132
Patent Document 15: Japanese Patent No. 3224023
Patent Document 16: Japanese Patent No. 3538816
Patent Document 17: Japanese Patent No. 4488697
Patent Document 18: Japanese Patent No. 4753399

SUMMARY OF THE INVENTION

Problems that the Invention is to Solve

Almost all small-sized lift-type wind turbine generators require an auxiliary power source for starting because those generators cannot be started by themselves. Therefore, the problem to be solved is an increase in cost associated with the installation of an auxiliary power supply system and a decline in the total electric power generation of a wind turbine due to the amount of electric power consumed by starting.

Well-known lift-type water/wind turbines that have a vertical axis and are rotatively driven include a linear wing type wind turbine and a Darrieus-type wind turbine. The disadvantage of those water/wind turbines is that initial startability is poor at a low fluid-speed area though fluid force is gained at a high fluid-speed area to rotate a blade at a rotation speed equal to or higher than a fluid-speed and the output coefficient generated by the high rotation speed is also high. In the Darrieus-type wind turbine that is believed to be better than a linear wing-type wind turbine particularly in terms of performance at a high fluid-speed area, the significant disadvantage is that startability is poor when a fluid is wind power, i.e., starting signs occur only at a wind speed of about 4 m/s.

A horizontal axis propeller type that has frequently been used as a lift-type wind turbine generator has a wide variety of performance characteristics on the basis of increase and decrease in its blade area, increase and decrease in the lateral width from its installation base to the tip of a feather, and variations in the streamline shape as the cross-section of a blade, but no invention has been made for the replacement of a blade that has already been installed or a device for changing the shape of a blade during operating time, and therefore the technological problem that has not been solved, i.e., "a blade that can be rotated at a high speed is hardly started by a weak wind, and on the contrary a blade that can be started with a weak wind can hardly achieve a high speed" remains unsolved.

A horizontal axis or vertical axis lift type shows excellent efficiency in energy conversion by lift rotation because lift gradually increases when a straight and stable wind hits it continuously. Unlike a straight wind in a wind tunnel laboratory, wind in the natural world minutely moves up and down, left and right even when the wind direction is approximately constant, and it has been observed that when the movement becomes large, the rotation speed suddenly declines in the middle of the rotation; therefore the technological problem is that changes in the number of revolutions must be suppressed to a stable level.

There are lift-type combined wind turbines in which a Savonius-type or cross flow-type drag-type wind turbine is installed for starting in order to enhance initial startability, wherein the technological problem remains unsolved, i.e., a large wind-receiving surface used for operating a drag type results in large resistance at a high-speed rotation area, which is the advantage of a lift type, so that the characteristics of a lift-type wind turbine at a high-speed area are compromised.

A Savonius-type drag-type wind turbine has a large wind-receiving surface and produces high torque by receiving wind force on its entire surface, but in the case of a combined water/wind turbine having a drag type installed, resistance further increases at the time of a strong wind because a lift-type blade is added to a drag-type blade having a large wind-receiving surface; therefore the problem that it is difficult to take suitable measures against a strong wind must be solved.

The problem is that in the case of a combined water/wind turbine, a drag-type wind turbine, which incorporates a technology of markedly reducing the factors of inhibiting the performance of a vertical axis lift type at a high-speed area, must be installed while enhancing the initial startability of the lift type, and a technology capable of converting water/wind force energy coming into a motor into rotation energy widely and more efficiently is required.

Another problem is that it is rare to find a water/wind turbine motor capable of generating electricity even at the time of a strong wind, i.e., energy in areas that have not been used must be developed and utilized.

Means of Solving the Problems

There is a means for making a water/wind turbine by combining a drag-type water/wind turbine and a lift-type water/wind turbine into a combined turbine in order to efficiently operate for areas ranging from a low wind-speed area at which a single drag-type water/wind turbine starts operating to a high wind-speed area produced by a single lift-type water/wind turbine, with one water/wind turbine.

In order to further enhance the startability of a combined water/wind turbine, there is a means for using a mechanism of allowing each of small pieces formed by vertically dividing a blade to be opened at a time when the drag-type blade moves against a fluid so that the blade surface otherwise receiving resistance is released and thereby the fluid can be blown through the released space of the blade toward the rear side thereof.

A vertical axis combined water/wind turbine motor that integrally rotates in the same direction can produce an advantage of improving the initial startability of a drag-type, and also at the abovementioned low speed area where the lift type cannot receive lift from a fluid, a lift type starts rotating as a result of being pulled by the drag rotation of the drag type, and this condition is effective as a means for improving rotation efficiency, i.e., the lift-type blade can always capture better fluid force more quickly and accurately without using any initial starting electric power, and also as a means for increasing the total electric power generation.

When the flow speed further increases and a lift-type blade rotating at a speed equal to or higher than a fluid-speed enters a high-speed rotating area, a concave surface of a drag-type blade whose rotation direction goes along with water/wind becomes a resistant surface. In order to produce conditions where the drag-type blade does not receive resistance even at the abovementioned occasion, a mechanism is such that at the stage where the rotation speed of a combined water/wind turbine becomes equal to or higher than a passive fluid speed, the concave surface that is the wind-receiving surface of the drag type is naturally released by force of resistance from the outside of the concave surface, wherein the resistance is generated from the direction opposite to the fluid direction. This is a means for reducing resistance otherwise received by the blade surface of the drag type, in all rotation areas ranging from a low-speed rotation area to a high-speed rotation area.

In order to further enhance startability and increase the passive area of a drag-type blade, multi-staged installation sharing a rotation axis 1 may be used as an effective means for solving problems.

As measures to avoid a danger at the time of a strong wind such as a typhoon, wherein the danger occurs when a large blade area of a drag type directly receives a strong wind and the main body of the drag type falls down, there is a means for avoiding disasters by releasing all the blades of the drag type, by decreasing the entire volume, or by decreasing the area of a wing by sliding and converging feathers into the rotation axis 1 side.

Effect of the Invention

By using a vertical axis combined water/wind turbine motor in which a drag type that has a function of rotating at a low fluid-speed area and shows reduced wing-surface resistance and a lift type that achieves high performance at a high fluid-speed area are integrally rotatable in the same direction, a function of broadening the passive fluid-speed area is provided that enables an integrated water/wind turbine motor 1 to be operated, and the effect that enables to capture much more energy and the effect of increasing rotation energy by reducing the water/wind turbine blade resistance of a drag type can be achieved.

The effect of the invention is a reduction in cost as a result of simplifying operation process for disasters and time savings because measures to handle dangerous high-speed rotation caused by a high-speed fluid can be adopted simply and instantaneously.

MODE FOR IMPLEMENTING THE INVENTION

Figure 1:
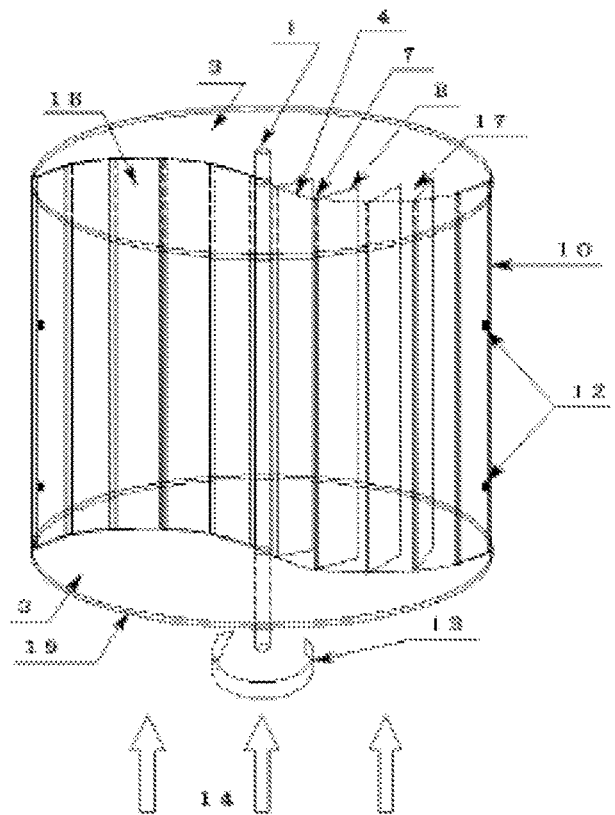
FIG. 1 is a perspective view of a vertical axis drag-type water/wind turbine motor, explaining a basic structure.
Figure 2:
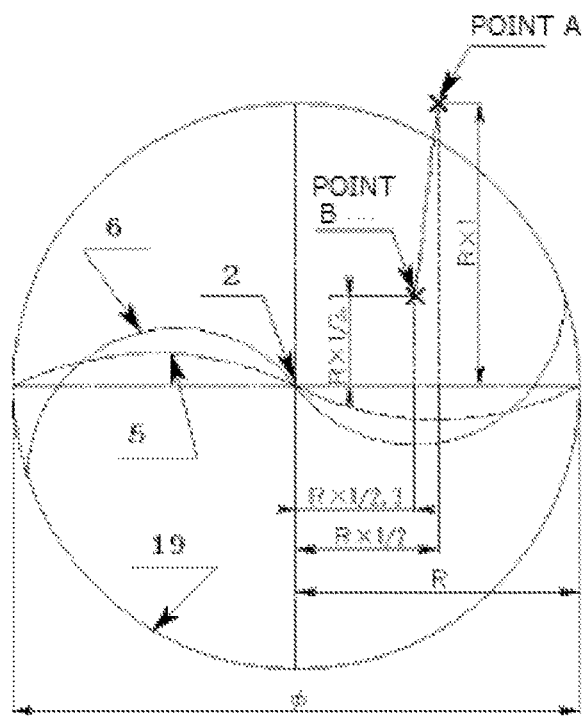
FIG. 2 is a plan view of a vertical axis drag-type water/wind turbine motor, showing a method of drawing a wing line shape of a water/wind turbine and its range.
Figure 3:
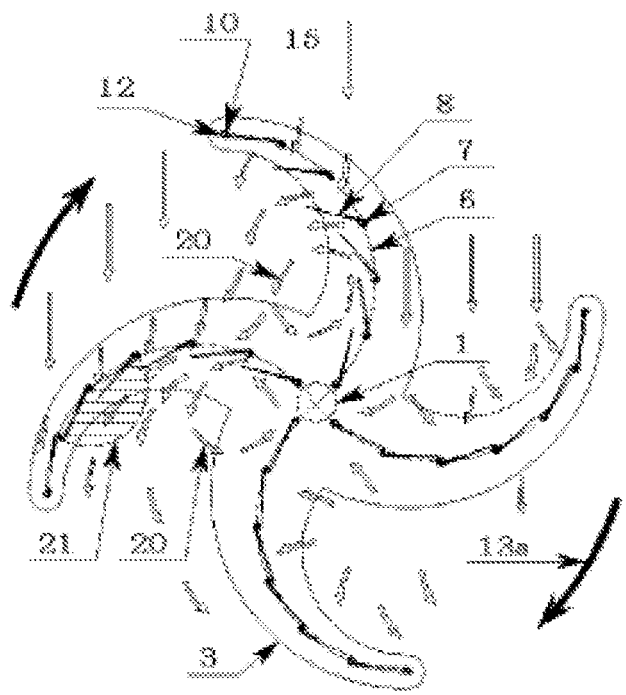
FIG. 3 is a plan view of a vertical axis drag-type water/wind turbine motor, showing wind flow and feather movement at the time of using and operating a wind turbine.
Figure 4:
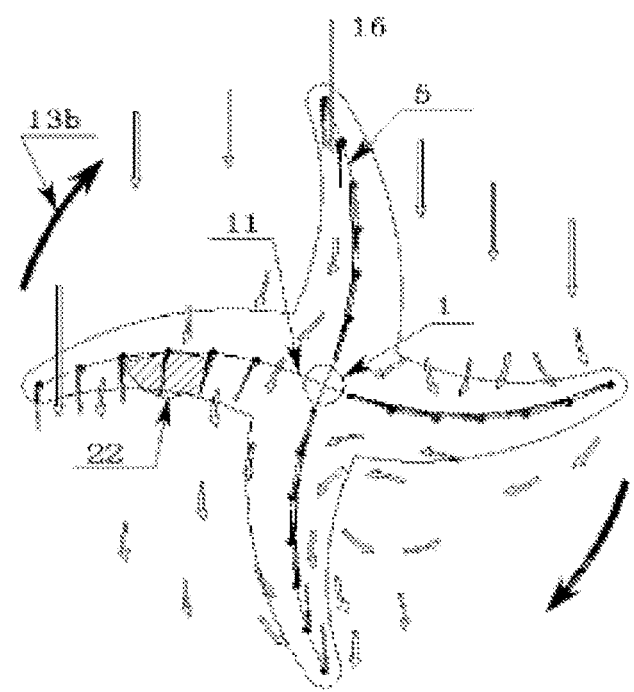
FIG. 4 is a plan view of a vertical axis drag-type water/wind turbine motor, showing wind flow and feather movement at the time of using and operating a water turbine.
Figure 5:
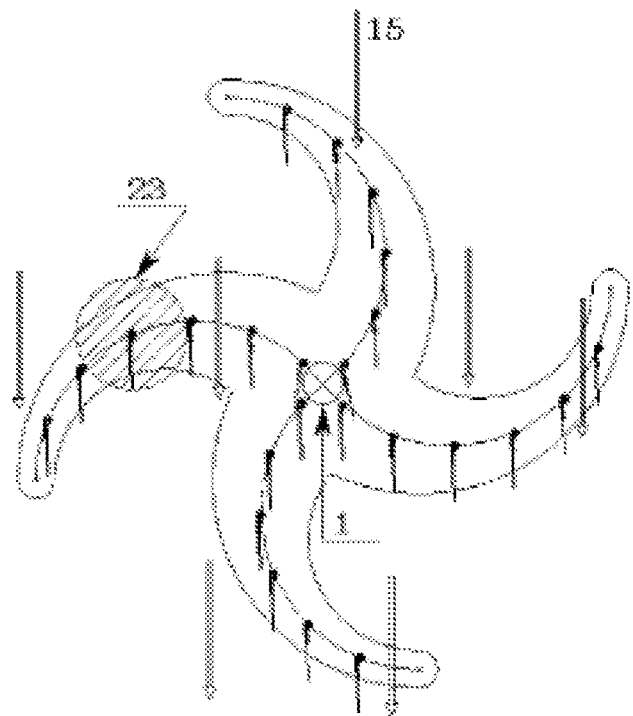
FIG. 5 is a plan view of a vertical axis drag-type water/wind turbine motor, showing the condition of feathers at the time of avoiding dangerous high-speed rotation, and wind resistance blowing through when a wind turbine is being used.
Figure 6:
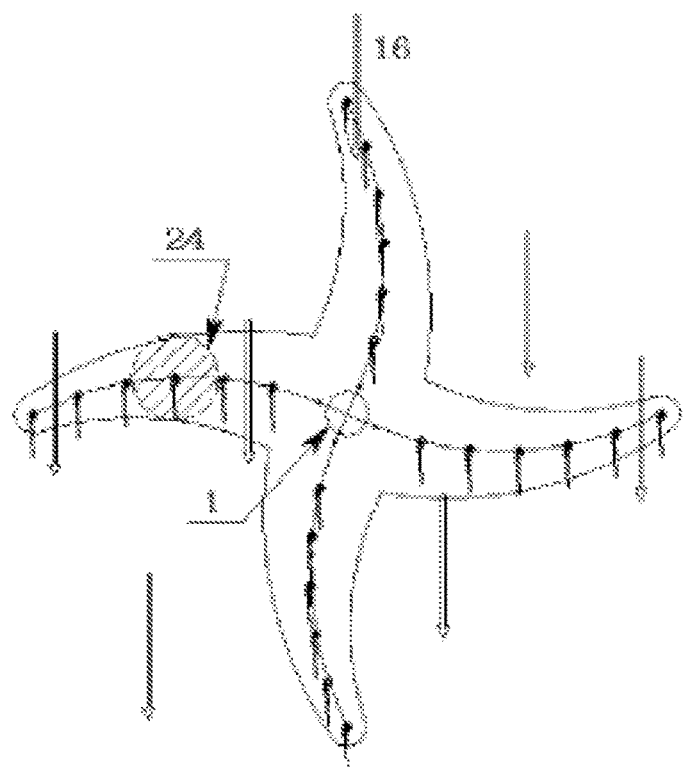
FIG. 6 is a plan view of a vertical axis drag-type water/wind turbine motor, showing the condition of feathers at the time of avoiding dangerous high-speed rotation, and the condition of water resistance slipping away when a water turbine is being used.
Figure 7A:
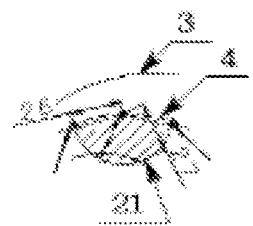
FIGS. 7A-7D are plan views showing in detail the rotating range of a feather of a vertical axis drag-type water/wind turbine motor and changes in the length of a feather in the short direction, wherein FIG. 7A and FIG. 7C drawings show the operating time and FIG. 7B and FIG. 7D drawings shows the time of avoiding dangerous high-speed rotation.
Figure 7B:
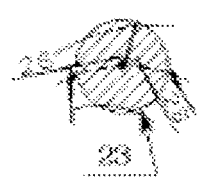
Figure 7C:
Figure 7D:
Figure 8:
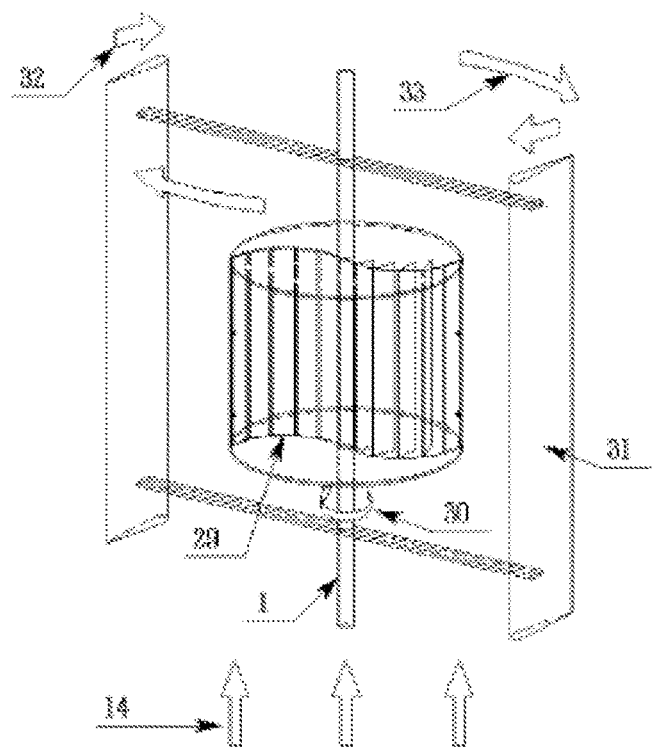
FIG. 8 is a perspective view of a vertical axis combined water/wind turbine motor (linear wing type).
Figure 9:
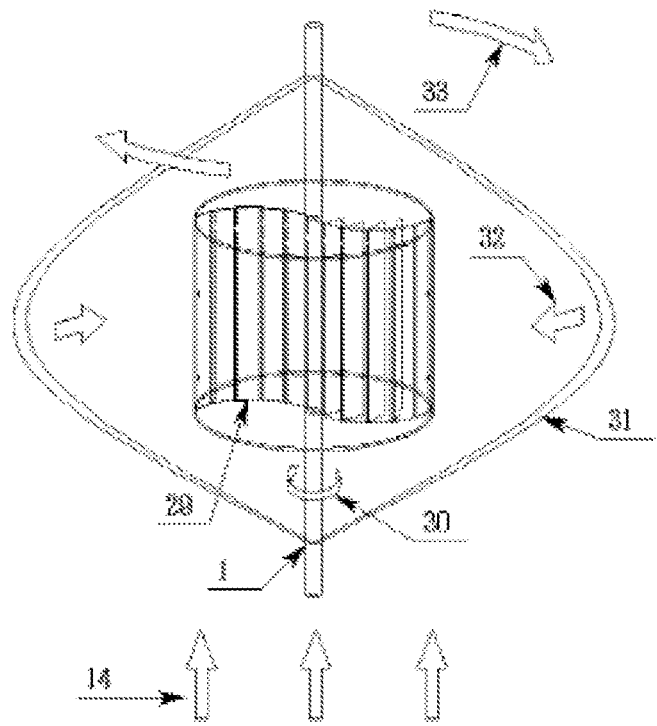
FIG. 9 is a perspective view of a vertical axis combined water/wind turbine motor (Darrieus type).
Figure 10:
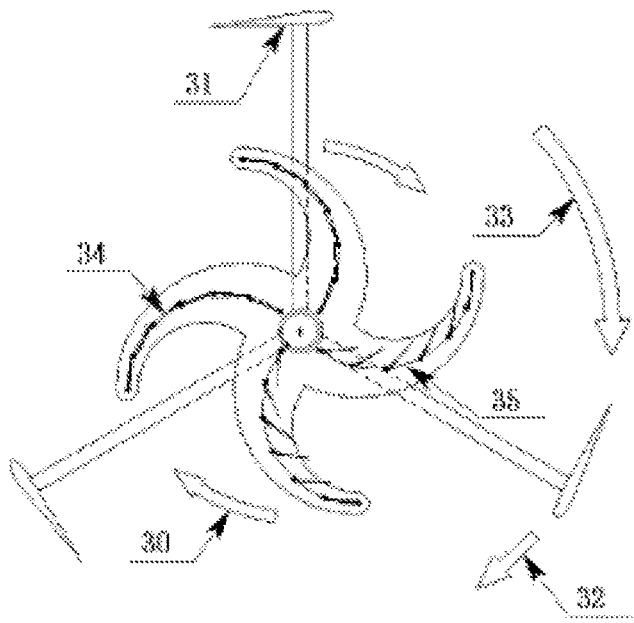
FIG. 10 is a plan view of a vertical axis combined water/wind turbine motor, showing a starting state.
Figure 11:
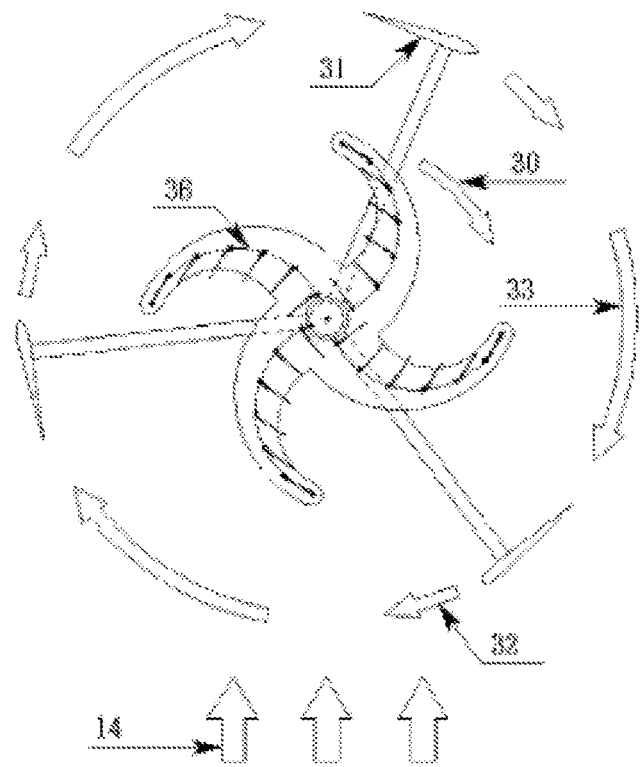
FIG. 11 is a plan view of a vertical axis combined water/wind turbine motor, showing a high-speed rotation state.

The mode should be such that a water/wind turbine is made by integrating a drag type that can easily be started from a low fluid-speed area and has a characteristic of high torque and a lift type that is rotated by lift at a speed equal to or higher than a passive fluid speed, for areas ranging from a middle fluid-speed area to a high fluid-speed area, and shows a high output coefficient, in such a manner that both types can be rotated in the same direction so that the turbine is operable from a low fluid-speed area to a high fluid-speed area.

The vertical axis lift type, which is characterized in that when a blade receives wind force, the tip end portion of the circumferential circle of a blade can be rotated at a speed equal to or higher than a wind speed, is represented by a Darrieus type and a linear wing type, and the mode should be such that a vertical axis lift type has one of those types or one having equivalent capabilities.

As regards the method of installing a lift-type water/wind turbine and a drag-type water/wind turbine for a vertical axis combined water/wind turbine motor, the mode should be such that a drag-type blade is installed on the inner side, which is on the rotation axis side of the vertical axis, and a lift-type water/wind turbine is disposed on the circumferential side of the rotating circle.

The mode should be such that each of feathers formed by dividing a blade vertically is opened toward the inner side of the blade arc at a time when a drag-type blade, which functions at the time of starting a vertical axis combined water/wind turbine motor, moves against a fluid so that the blade surface otherwise receiving resistance is released and thereby the fluid can be blown through the released space of the blade toward the rear side thereof to lower resistance, and when the blade becomes concave relative to the fluid after turning to the other side in order to gain rotational force from fluid force, more passive surfaces are formed, and this cycle can be repeated each time without requiring any other new power, and a part of fluid force coming into the main body before it becomes rotational force for the water/wind turbine can naturally be employed as the force takes its own course.

New resistance is generated at a time when the fluid speed further increases and the blade is rotated at a speed equal to or higher than the fluid speed by lift of a lift-type blade and becomes force against the rotation by hitting the outer surface of the concave surface, which goes along with the fluid, and therefore the mode should be such that the feathers that should be released toward the inner side of the blade arc as described Paragraph 0026 above are naturally opened so as to lower resistance.

As one of purposes for increasing the blade passive area of a drag type so as to further enhance startability, the mode may be such that a multi-staged drag-type water/wind turbine sharing the rotation axis 1 as the same axis is installed.

In the case of the multi-staged drag-type water/wind turbine, the mode should be such that blades mounted on objects to be rotated are installed by shifting their directions and positions for each stage so that a fluid can be captured from eight directions rather than four directions, i.e., without missing any direction.

As a method of integrating a lift-type water/wind turbine and a drag-type water/wind turbine in a vertical axis combined water/wind turbine motor, the mode may be such that besides an integrated structure at any rotation speed, a structure having a cam such as a bearing cam disposed at a rotation connecting part where two turbines are integrated is provided, as needed, so that a mechanism of making the cam come off at a time when the rotation speed of the lift-type blade becomes faster than the rotation speed of the drag-type blade can be incorporated.

As measures against dangerous high-speed rotation of a drag-type water/wind turbine blade, the mode should be such that a system capable of achieving the purpose with simple and instantaneous operation, i.e., a system of rolling in the base of a feather about half to two rotations is incorporated, without requiring large-scale work such as the removal of blades attached to the main body of a water/wind turbine or the removal of the main body itself.

As a method of folding a blade of a drag-type water/wind turbine, the mode should be such that the blade has three fulcrums in divisions of a wing of the upper and lower support plates and is bent in the horizontal direction of the support plates so that the blade is folded toward the center of the rotation axis 1, and the entire volume of the drag-type blade is decreased.

As the method of drawing the feathers 8 and rotation axes 7 of a drag-type water/wind turbine wing, the mode should be such that both ends of the rotation axis 7 are held by a guide table, on which a driving ball screw-type axis or a guide rail-type rail is placed in a movable manner, at positions of the upper and lower support plates 3 as one single unit, so that the area of the drag-type blade wing can be decreased by a mobile system capable of drawing the wing toward the rotation axis 1 for each single unit.

When the purpose of use is changed between a water turbine and a wind turbine, they can be used without changing the external structure and parts, but in order to enhance efficiency, the mode should be simple and unitary, i.e., it should be enough to change only the mounting positions of feathers between a wind turbine in which the mounting position of feathers, which constitute a drag-type blade and have a shape of vertically divided small pieces, are started from the center side of the circle and one in which feathers are sequentially installed from the circumferential side.

Embodiment 1

The vertical axis combined water/wind turbine motor according to the present invention has a structure of combining a drag-type water/wind turbine and a lift-type water/wind turbine as a basis.

The drag-type water/wind turbine and the lift-type water/wind turbine are arranged in such a way that drag-type blades having a flight feather opening/closing wing system is installed on the inner side, which is the rotation axis 1 side, and lift-type water/wind turbine blades having two wings or more are disposed on the outside of the rotating circle of the drag-type water/wind turbine in the rotational symmetry centering on the rotation axis 1.

The drag-type water/wind turbine having a flight feather opening/closing wing system and the lift-type water/wind turbine are integrated into a water/wind turbine, wherein the rotation direction thereof is the same.

As regards the method of integrating a lift-type water/wind turbine and a drag-type water/wind turbine in a vertical axis combined water/wind turbine motor, the structure may be such that a cam such as a bearing cam is disposed at a rotation connecting part where two turbines are integrated, as needed, and the vertical axis combined water/wind turbine motor, which is started and rotated by the drag type, has a mechanism in which the latching of the cam comes off at a time when the rotation speed of a lift-type blade becomes faster than the rotation speed of a drag-type blade. It is said that this integration method is effective in preventing the resistance and weight of the drag-type blade from burdening on the rotational force produced by lift.

The lift-type water/wind turbine, which is one of the turbines combined in a vertical axis combined water/wind turbine motor, is a vertical axis lift type, which is capable of generating lift by receiving fluid force on its blade and has its tip end portion of the circumferential circle of the blade rotated at a speed equal to or higher than a fluid speed.

The type classified as the vertical axis lift type is represented by a Darrieus type and a linear wing type, and one of those two types or a vertical axis lift type having equivalent capabilities is selectively installed on a vertical axis combined water/wind turbine motor.

The drag-type water/wind turbine having a flight feather opening/closing wing system, which is one of the turbines combined in a vertical axis combined water/wind turbine motor, is used for starting the vertical axis combined water/wind turbine motor as its major role. Accordingly, a blade that generates high torque has a large passive surface so that the passive surface can receive large fluid force and force can be utilized as drag to generate rotational force for starting.

In order to further enhance startability as needed, the mode may be such that a drag-type tandem water/wind turbine sharing the rotating axis 1 as the same vertical axis is installed for the purpose of raising torque by enlarging the blade passive area of the drag type as well as for the purpose of increasing the number of revolutions by using a vertically long shape with an increased aspect ratio.

In the case of a multi-staged drag-type water/wind system, as regards the installation direction of a wing oriented toward the tip end portion of the wing line shape 4 on the circumferential edge side from the mounting side of the rotation axis 1 of the wing line shape 4 as the basis, it is preferred that each stage of the multi-staged drag type be disposed in such a manner as to change its direction and position in order to capture fluid force from all directions without missing any force.

The explanation of a drag type having a "structure of a drag type for starting, which constitutes a vertical axis combined water/wind turbine motor" as described in embodiments and other sections is the same as the explanation of a drag type when it is used alone, and the drag type has a "flight feather opening/closing wing system."

Here, the blade frequently used above is the same as the wing frequently used in the explanation of a drag type having a flight feather opening/closing wing system. The structure of a drag-type blade according to the present invention is different from one constituted of one plate as seen in a Savonius type as a typical drag type, and the present inventor got an idea from an avian structure in which a "wing," which is referred to as "tsubasa" or "yoku" in Japanese, is formed by arranging flight feathers consisting of a tertiary flight feather, a secondary flight feather and a primary flight feather and from a mechanism in which flight feathers are naturally opened/closed by the vertical movement of the wing and thereby birds receive "lift" and "thrust" as flying force, and since it is difficult to technologically explain the present invention, which employs similar principle and movement as mechanics to produce rotational force, with one word "blade," the present inventor uses "wing" and "feather" separately at the time of explaining a drag type.

As regards the structure of a drag type for starting, which constitutes a vertical axis combined water/wind turbine motor according to the present invention, wings formed in the rotational symmetry with respect to the central rotation axis has a bow-like arc shape and is fixed to support plates at its both ends as a basic structure, wherein the wing is constituted of several feathers, the feather is attached to a feather rotation axis at one of its vertical sides, and the mechanism is such that a water/wind turbine is rotated with high efficiency by automatic opening/closing of the feathers.

The drag-type water/wind turbine having a flight feather opening/closing wing system for starting is a vertical axis type and has such a structure that the stretch of the wing line shape 4 having a bow-like arc shape in the rotational symmetry centering on the rotation axis 1 is subdivided into three or more divisions preferably at even intervals, and the feather rotation axis 7 is inserted into a borderline and fixed to the support plates 3 at its both ends, wherein: the feather rotation axis 7 is attached with one of vertical sides of the light-weight feather 8, and the other vertical side is free; the rotation range is on the arc center side of the wing line shape 4 and has a fan shape up to the adjacent feather rotation axes 7 on both sides; and the abovementioned feather rotation axes 7 and feathers 8 arranged on the wing line shape 4 on one side bordering on the rotation axis 1 constitutes a wing as one set.

When the wing described in Paragraph 0047 above is moving toward a fluid and is thereby convex, the feathers 8 are opened, and when the wing is concave after rotation, a space between the feather rotation axes is closed and forms a passive surface, before the wing becomes concave, in such a manner as to be arranged in the direction opposite to the fluid direction by force of wind that goes around toward the inner side of the arc of the wing line shape 4. When wind blows into the passive surface, the wing gains rotational force and is rotated centering on the rotation axis 1.

When the wing described in Paragraph 0047 above is moving toward a water flow and is thereby convex, the feathers 8 are opened, and the feathers start closing spaces between the feather rotation axes along an arc shape sequentially from the rotation axis 1 side by force of the water flow, as the wing of the water turbine is about becoming concave, and around the time when the entire wing becomes parallel to the water flow, a half of the feathers 8 of the wing line shape 4 on the downstream side are closed because the wing has an arc shape, and at the abovementioned speed, a passive surface is orderly formed. As it is further rotated, the water flow hits the completed passive surface so that the wing gains maximum rotational force and is rotated centering on the rotation axis 1.

As to shape characteristics, the rotation area for gaining rotational force by the arc-shaped passive surface of the wing described in Paragraph 0049 above is larger than that of a vertical axis drag-type linear wing formed by attaching one side of a flat plane to a rotation axis (slightly larger than 180°). In addition, an impact created between a water flow and the feathers 8 at the time of forming as well as releasing a passive surface of the feathers 8 is decentralized because the wing has an arc shape and feathers are gradually opened or closed one by one after a small time lag from the motion of an adjacent feather, and is also mitigated because the entire flow occurring within the wing is smooth by virtue of its streamlined arc shape so as to create water turbine rotation capable of maintaining passive force for a long time within the arc shape. Rotation with a mitigated impact means that the present technology can supply converted energy with stable quality by operating a water turbine installed in the river or the like and is also superior to other technologies in terms of the effect of suppressing the occurrence of a muddy stream caused by a water/wind turbine structure.

Unlike an arc-shaped wing, the opening/closing of feathers is performed at the same time in a vertical axis drag-type linear wing attached with one side of a flat plane at its rotation axis, and passive force is received after the wing passing a position where it becomes parallel to a water flow, wherein there is a confirmed phenomenon that force is lost all at once along the tilted surface of the drag-type linear wing at about 135° backward diagonally from the abovementioned position. Accordingly, the rotation range for gaining rotational force is small, and the problem that an impact at the time of switching over between the passive stage and the released stage increases remains unsolved.

The shape of the wing line shape 4 forming an arc of a drag-type wing having a flight feather opening/closing wing system and constituting a vertical axis combined water/wind turbine motor is preferably as follows: given that a point that is vertically radius R of the circular support plate 3 away from ½ of a radius R line is referred to as Point A and a point that is vertically (in the direction of Point A) radius R×1/3.1 away from radius R×1/2.3 on the same radius line from the circular center toward the circumferential circle side is referred to as Point B, the center of a wing arc is approximately on the line connected between Point A and Point B, wherein the bow-like wing line shape 4 goes along an arc from the center of the support plate 3 to the circumferential circle.

The drag-type wing having a flight feather opening/closing wing system and constituting a vertical axis combined water/wind turbine motor has the wing line shape 4 that is selected in accordance with wind, water or strength thereof, wherein in the water/wind turbine, two or more wings having the wing line shape 4 of the same shape are disposed in the rotational symmetry.

The feather 8 of the drag-type wing having a flight feather opening/closing wing system and constituting a vertical axis combined water/wind turbine motor is characterized in that: light weight is emphasized as a whole and particularly light weight is desired at the time of utilizing wind force so that it can easily be moved toward the upwind side by the wind that goes around into the inner side of the arc at or around a position where the wing line shape 4 approximately overlaps with the upwind direction; the feather 8 is made of a material having a bending strength high enough to avoid being broken or coming off by its movement between the feather rotation axes; and it is constituted in a plate shape as a whole.

The feather 8 is preferably rectangular and is attached to the feather rotation axis 7 at one of its longitudinal sides, wherein its length in the longitudinal (vertical) direction is slightly shorter than the length between the support plates 3 on both ends of the feather rotation axis.

The length of the short (lateral=horizontal side) direction 27 is slightly longer than the distance of arc subdivisions (=distance 26 between feather rotation axes) of the wing line shape 4 described in Paragraph 0052 above, and thereby the function and shape of the feather 8 is such that the tip end that is free in the longitudinal direction on the center side of the arc-shaped wing line shape can freely be rotated individually in a fan shape between the right-and-left feather rotation axes 7 on both sides (the feather rotation range during the operating time of a wind turbine: 21, the feather rotation range during the operating time of a water turbine: 22).

In the drag-type wing having a flight feather opening/closing wing system and constituting a vertical axis combined water/wind turbine motor, the abovementioned free rotation within the fan-shaped feather rotation range 21 during the operating time of a wind turbine or the feather rotation range 22 during the operating time of a water turbine can be achieved by: using a bendable material at a portion of the feather 8 in the vicinity of its feather mounting part and allowing the material to be bent; allowing the feather rotation axis 7 covered with a pipe to be rotated;

attaching a hinge or a similar tool to a connecting part between the feather rotation axis 7 and its feather mounting part and allowing it to be rotated; or attaching tools for enabling the feather rotation axis 7 to be rotated at the support plates 3 on both ends and then allowing those tools to be rotated.

In order to enhance the rotation function of a water/wind turbine, the feather 8 is made of a fiber material such as glass fiber and carbon fiber, which is light-weight and has a high strength, on the basis of the barbs and barbules of avian flight feathers and an uncinate process structure, and is integrally formed into a plate shape as a whole using resin or the like or is formed into a plate made of polypropylene or fluorinated resin or a plate made of fiber such as cloth or the like, wherein among those, the feather 8 used for a wind turbine is light-weight so that it can easily be rotated and moved by the wind (equivalent to Beaufort wind force scale 1) that hits the area of the feather 8 in conditions where it is fixed to a rotator such as the feather rotation axis 7 at one of its vertical sides. In addition, it is plate-shaped and made of a material having a bending strength high enough not to allow breaking or pulling out the feather 8, which lies over the distance 26 between the feather rotation axes on the wing line shape 4 described in Paragraph 0056 above at a time when the wing of the water/wind turbine becomes concave to receive water/wind force.

By forming the feather 8 into one sheet having a plate shape, minute turbulences of water or wind flowing toward the rear of the feather 8 are rectified at a time when the wing is convex and the feathers are allowing a water/wind flow to flow therethrough, so that a flow speed on the rear side of the water/wind turbine is increased and thereby a flow speed on the front is accelerated, with the result that the rotation energy of the water/wind turbine is produced with high efficiency.

As regards the feather 8, depending on the purpose of using a water/wind turbine motor, a portion of the feather 8 in the vicinity of its feather mounting part is made of a soft material such as fiber, resin and rubber that can be wound around the feather rotation axis 7 several times or made of a material that can be drawn in, wherein the material has a tensile strength and the portions of the feather 8 other than the portion in the vicinity of the feather mounting part is plate-shaped. The abovementioned tensile strength refers to a strength high enough not to allow the feather 8 to be pulled off from its feather mounting part in conditions where the feathers 8 allows a water/wind flow to flow therethrough and receive force from the water/wind flow or where the feather 8 is about to be opened/closed by force of a water/wind flow and the feather 8 centering on the feather rotation axis 7 receives the force of the water/wind flow approximately on the entire surface of the feather 8.

The length of a portion wound around the feather rotation axis 7 several times as described in Paragraph 0060 above refers to a pulling-in length 9, which shortens the tip end portion of the free vertical side of the feather 8 so that the tip end portion cannot come into contact with the adjacent feather rotation axes 7 on both sides.

The vertical axis combined water/wind turbine motor according to the present invention is available as a water/wind turbine and when the purpose of use is changed between a water turbine and a wind turbine, can be used without changing any of the external structure of the wing of a drag type, parts and the like. However, it is important to enhance the rotation efficiency of a water/wind turbine, and when it is used as a wind turbine, the rotation efficiency of the wind turbine is enhanced by employing the bow-like wing line shape 4 having its center in the vicinity of Point B rather than Point A described in Paragraph 0052 above, disposing the feathers 8 starting from the feather rotation axis 7 on the water turbine rotation axis 1 side, and using an axis at the most tip end portion as a simple fixing axis 10.

When it is used as a water turbine for the purpose of enhancing the rotation efficiency of the water/wind turbine just as described in Paragraph 0062 above, the feathers 8 arranged on a drag-type wing are installed starting from the feather rotation axis 7 that is the farthest away from the water turbine rotation axis 1, and the feather rotation axis 7 that is the nearest to the water turbine rotation axis 1 is used as a feather rotation stopping axis 11, wherein in the case of the water turbine, no feather simple fixing is employed unlike the wind turbine.

In the case of a water turbine, the mounting positions of feathers and the arc shape of the wing line shape 4, which are changed between the wind turbine described in Paragraph 0062 and the water turbine described in Paragraph 0063, are based on a typical behavior characterized in that since the flow-down resistance of water is larger in the water turbine than the wind turbine, all the tip end portions of the free vertical sides of the feathers 8 move toward the water/wind turbine rotation axis 1 side together at or around the time when the wing approaches the upstream side.

In the case of a wind turbine, the mounting positions of feathers and the arc shape of the wing line shape 4, which are changed between the wind turbine described in Paragraph 0062 and the water turbine described in Paragraph 0063, are based on a motion behavior characterized in that since the flow-down resistance is small as compared with water, the tip end portions of the feathers 8 are guided together outwardly from the center of the water/wind turbine, thereby causing the feathers 8 to be tilted uniformly. This motion behavior occurs on the basis of various factors including centrifugal force, a vortex flow 20 drawn into the inner side of the arc of the wing line shape 4 while the water/wind turbine is rotating, wind going around into the inner side of the feather 8 that is simply fixed (or released at the time of a strong wind) on the outermost circumferential circle, wind blowing into a space between two wings immediately before the wing surface becomes concave from a convex shape with respect to wind and going around into the inner side of the arc, and wind blowing into the feather rotation axes 7, which are about to be arranged vertically against a wind flow at the same period as described above, going around into the inner parts of the feather rotation axes 7 and the mounting parts of the feathers 8 on the rotation axis 1 side and then drawing the adjacent feathers 8 below on the rotation axis 1 side, singly, as a combination of two or more, or synergistically. Additionally, in the wind turbine, the simply-fixed outermost feather 8 has already been tilted toward the rotation axis 1 side at a time when the wing surface is convex against wind, i.e., the wing is moving against a wind flow (i.e., in conditions where the sail of a sailing ship receives wind when it is moving against a wind flow), and this also adds a rotational thrust to the wind turbine.

As regards a mechanism of opening the feathers 8 by force of resistance received at a time when the drag-type wing surface becomes convex against wind, even when the rotation speed of the vertical axis combined water/wind turbine motor is determined by the lift of a lift-type blade and reaches or exceeds a flow speed, the feathers 8 are opened toward the inner side of the wing arc on the basis of relative strength when the drag-type wing becomes concave with respect to the water/wind flow direction and fluid energy received on the outer surface of the arc of the wing in the direction opposite to the water/wind flow direction increases, wherein the feathers 8 are brought into an open state in all rotation areas of the drag-type wing.

As the next stage, when the motion for the rotation of the vertical axis combined water/wind turbine motor is switched to rotational force of the drag-type wing from the rotational force of the lift-type wing, as fluid force declines, the feathers 8 of the drag-type wing, which is concave with respect to the fluid, naturally forms a passive surface by means of fluid force alone without requiring any new device or a PC programmed signal.

The advantage of bringing the feathers 8 into an open state in all rotation areas of the drag-type wings as described in Paragraph 0066 above is to achieve the effect of lowering rotation resistance because approximately the entire area of the drag-type blade is released, so that the rotational force of the vertical axis combined water/wind turbine motor increases more than other motors.

The advantage of bringing the feathers 8 into an open state in all rotation areas of the drag-type wings as described in Paragraph 0066 above is to enable the lift-type wing to receive fluid force more at a portion behind the water/wind turbine with respect to a fluid. A conventional drag-type wing for starting is a fixed plate, and when a fluid hits the object, the flow creates a void portion on the rear side of the object, which is approximately circular and has a flow speed of approximately zero. Since the void portion is pushed by the flow toward the rear side while keeping its shape, a lift-type wing passing through the portion cannot receive sufficient fluid force, while the advantage of the wing according to the present invention is that since the feathers 8 are totally opened, a fluid is allowed to flow toward the rear side of the object while keeping its natural flow, so that the lift-type wing can receive fluid force more.

The advantage of bringing the feathers 8 into an open state in all rotation areas of the drag-type wings as described in Paragraph 0066 above is to lower resistance of the entire structure of the vertical axis combined water/wind turbine motor so that the flow speed of a fluid on the front surface of the object is not decelerated, and thereby the rotation energy of the water/wind turbine (which is believed to be the $3^{rd}$ power of a wind speed) is amplified, and the rotation efficiency of the vertical axis combined water/wind turbine motor can be improved.

At the time of switching the stage to the open state of the feathers 8 for all rotation areas of the drag-type wing described in Paragraph 0066 above and also at the time of switching the stage to the formation of a passive surface of the drag-type wing described in Paragraph 0067 above, the mechanism is such that the feathers 8 can naturally be "opened and the passive surface formed" by a small pressure difference created by fluid force between the inner side of the arc of the wing line shape 4 of the drag-type wing and its outer side without requiring any new device or PC programmed signal transmission; therefore the present invention is characterized by a simple mechanism in which the rotational thrust of the vertical axis combined water/wind turbine motor is maintained as a smooth flow.

As measures to avoid a danger of approaching typhoons or increased flow speed of water after installing a water/wind turbine motor, an important matter to be addressed is resistance received by a large area of a drag-type wing constituting the combined water/wind turbine. As the measures, the present invention enables to avoid a danger for the entire vertical axis combined water/wind turbine motor by providing the following, singly or in combination: the feathers 8 constituting a drag-type wing are rolled or pulled into the feather rotation axes 7 so that all the feathers can be brought into a streamer state; a drag-type wing is folded toward the rotation axis 1 side to make its volume decreased; resistance is reduced by decreasing the area of a wing by drawing feathers attached to the wing toward a rotation axis side; or when a vertical axis combined water/wind turbine is used as a mounted structure, its main body is protected by weakening incoming wind with a mesh-patterned hanging screen, which is placed between support columns installed at the circumference of the main body of the water/wind turbine.

As one of the measures to avoid a danger of approaching typhoons or increased flow speed of water after installing a water/wind turbine motor, the method of bringing all the feathers 8 into a streamer state can be achieved by rolling or pulling in a portion in the vicinity of the feather mounting part, which is part of the structure of the feather 8 as described in Paragraph 0060 above, for the rolling-in length 9 as described in Paragraph 0061 above. As a result, the feather 8 has the length 28 in which the feather is not brought into contact with the left-and-right feather rotation axes 7 on both sides, and all feathers can stream along a fluid freely for 360° centering on the feather rotation axes 7 so that the rotational force of the water/wind turbine is lost, the fluid resistance of the main body of the water/wind turbine is significantly reduced, and thereby the safety of the entire facility can be assured. It is possible to take quick and simple measures not only during operating time but also for the assurance of safety of the entire facility as described above by pulling or rolling in a portion in the vicinity of the feather mounting part into the feather rotation axis 7 for about half to two rotations.

The method of rotating a motor using a device for folding a wing of a vertical axis drag-type water/wind turbine and avoiding a danger of a strong wind or increased water flow speed is characterized in that bending fulcrums are provided that makes bending possible in the horizontal direction at a horizontal position of each of the upper and lower support plates 3, and by this bending, the surface of the wing constituted of the feather rotation axes 7 and the feathers 8, which are supported by the support plates 3, is folded toward the inner side of the wing arc.

The folding line of the wing surface of the wing line shape 4 is a line approximately in parallel with the rotation axis 1, and the folded divisions of the wing surface are made by subdividing the stretch of the wing line shape 4 into two or more divisions.

As a result of folding the wing surface, each of the wings of a drag type disposed in the rotational symmetry is rolled into the rotation axis 1 side so that the passive surface relative to a fluid is lost and the rotational force gone, and furthermore since the drag-type water/wind turbine is decreased in its entire volume and is fixed, resistance is reduced for the entire structure of the water/wind turbine, and thus a danger at the time of a strong wind or increases water flow speed can be avoided within a reduced period of time by carrying out simple operation (as compared with a method of inclining the main body of a propeller-type iron tower, for example).

As one of the methods for folding and fixing a drag-type water/wind turbine blade, a support plate folding rotation axis is used as a fulcrum, and expansion power of an expansion tool using the reversible rotation of a hydraulic jack or a driving ball screw-type ball screw, which plays a role of a force point of a lever as used in mechanics, is placed slightly away from the fulcrum toward the rotation axis 1 side.

Figure 12:
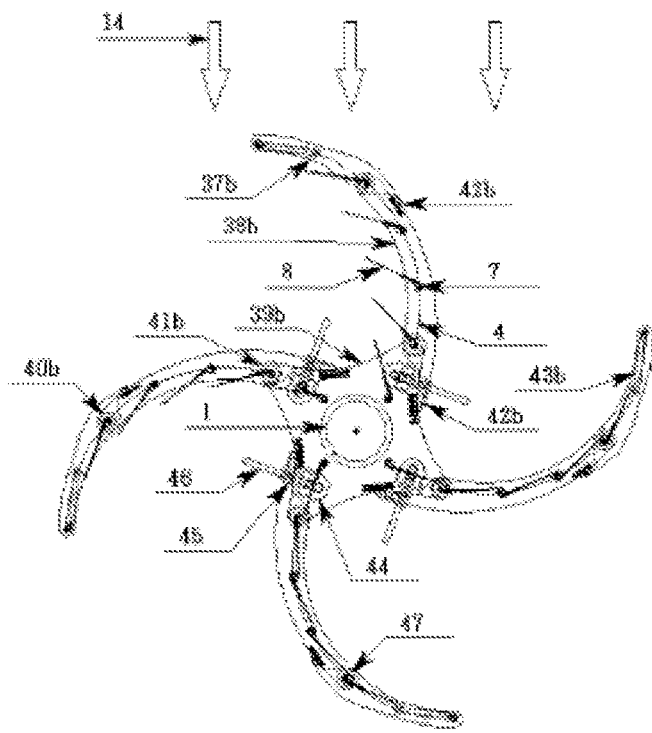
FIG. 12 is a plan view of a wing folding-type water/wind turbine using both an expansion device and a motor during operating time.
Figure 13:
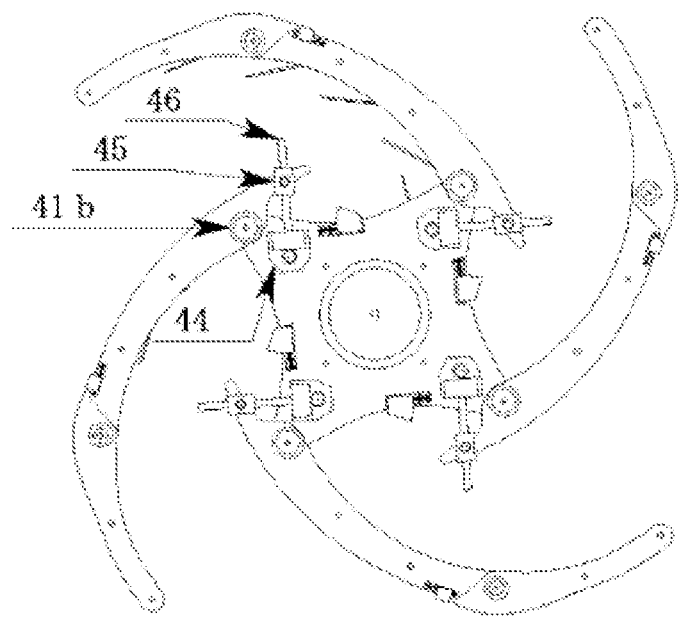
FIG. 13 is a plan view of a wing folding-type water/wind turbine using both an expansion device and a motor in the folding stage.
Figure 14:
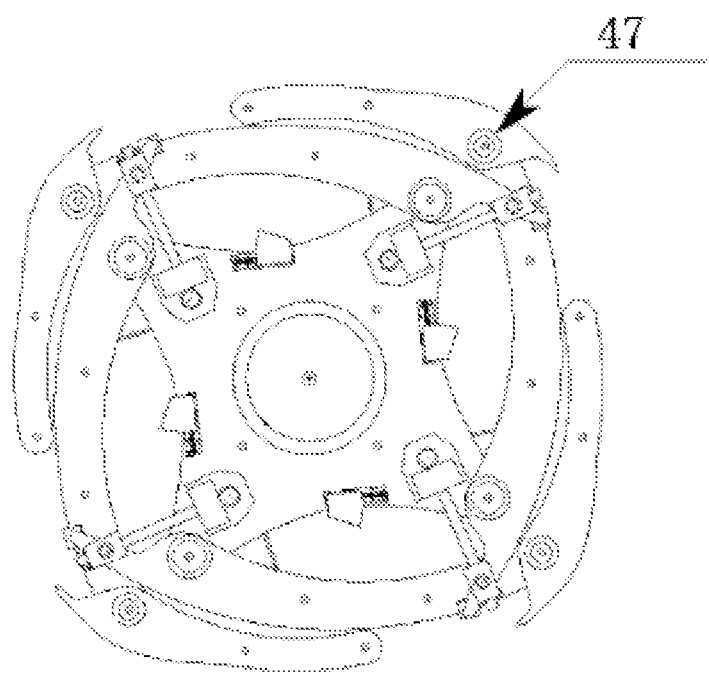
FIG. 14 is a plan view of a wing folding-type water/wind turbine using both an expansion device and a motor at the time of storage.
Figure 15:
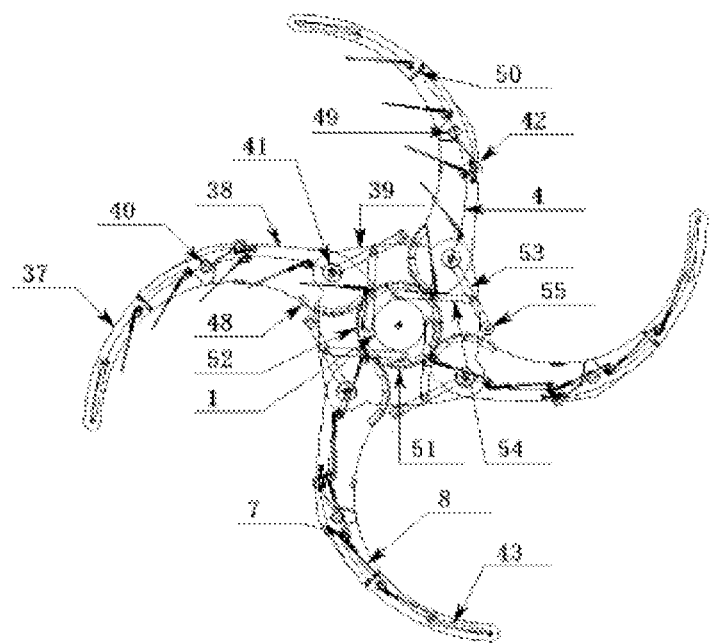
FIG. 15 is a plan view of a wing folding opening/closing-type water/wind turbine using rotation center gear rotation power during operating time.
Figure 16:
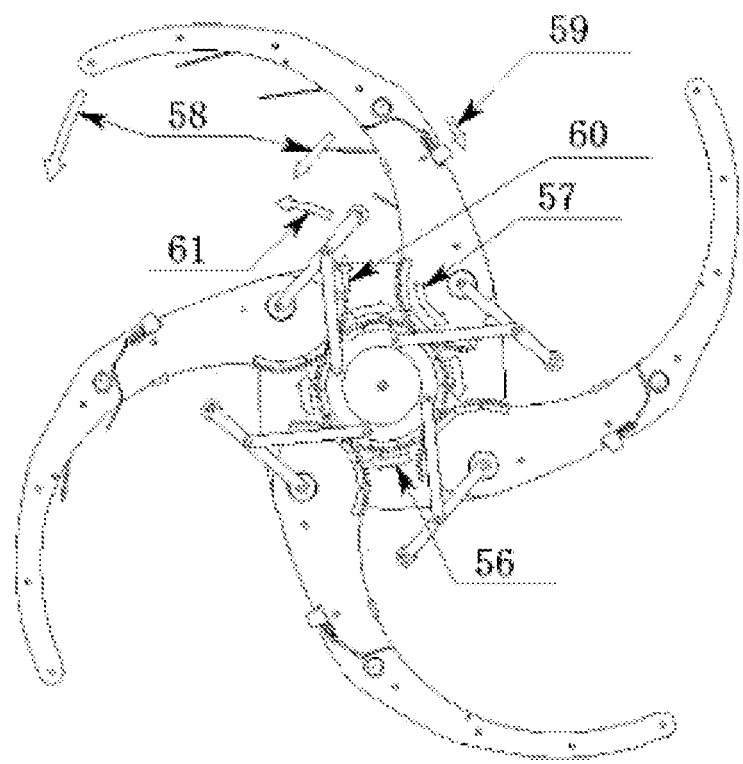
FIG. 16 is a plan view of a wing folding opening/closing-type water/wind turbine using rotation center gear rotation power in the initial folding stage.
Figure 17:
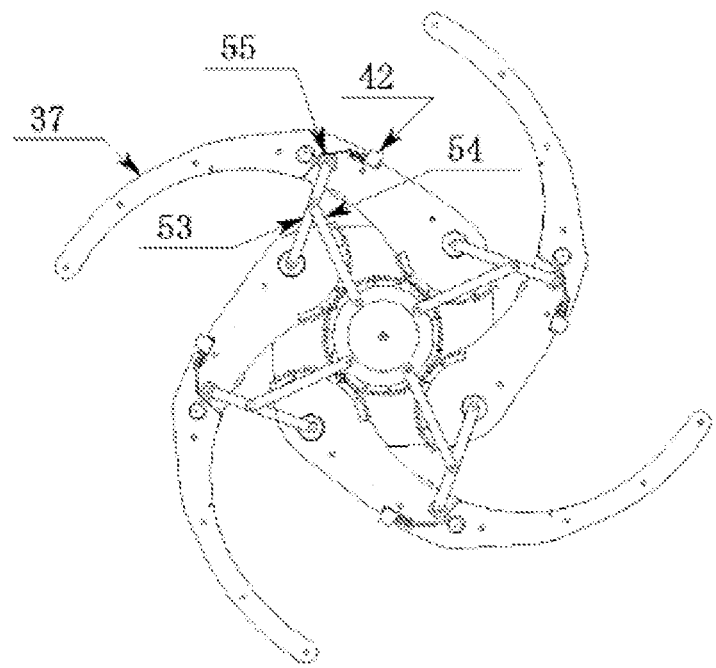
FIG. 17 is a plan view of a wing folding opening/closing-type water/wind turbine using rotation center gear rotation power in the middle folding stage.
Figure 18:
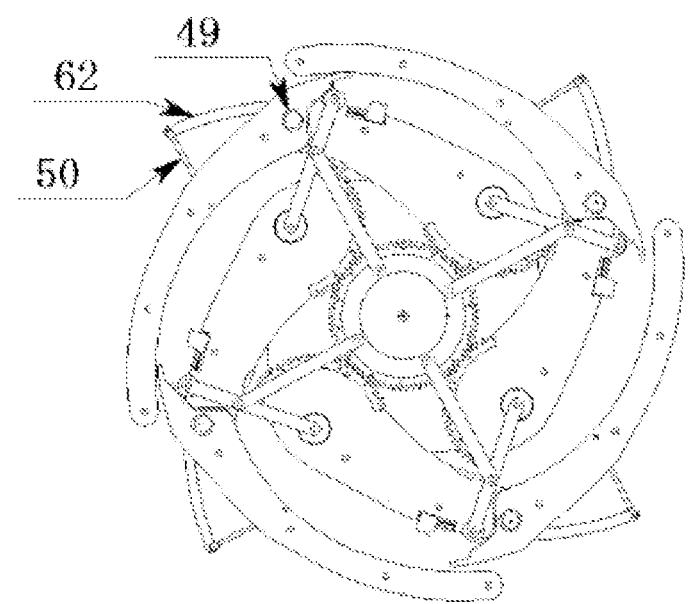
FIG. 18 is a plan view of a wing folding opening/closing-type water/wind turbine using rotation center gear rotation power in the folded/stored stage.
Figure 19:
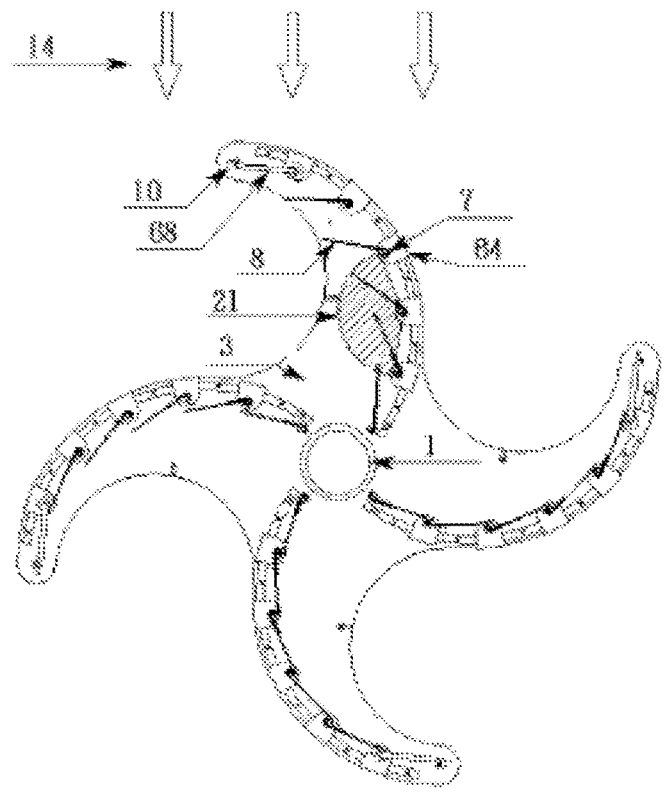
FIG. 19 is a plan view of a feather drawing/storing-type water/wind turbine during operating time.
Figure 20:
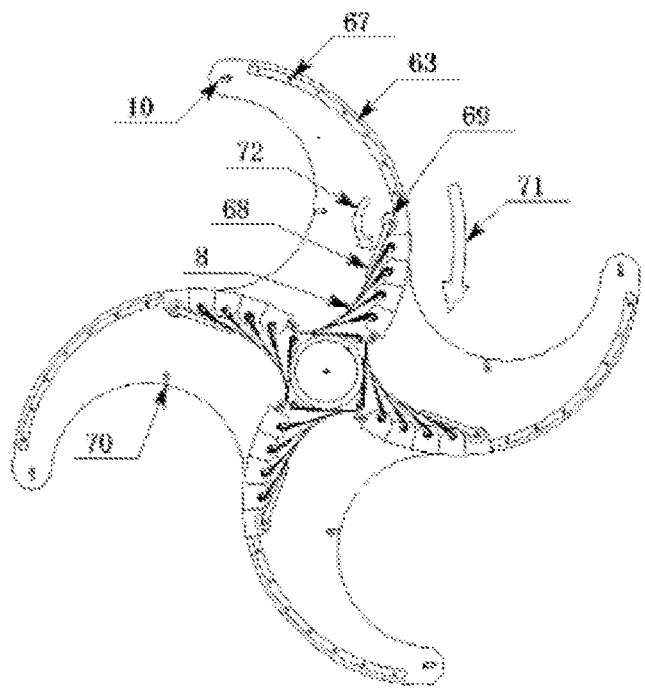
FIG. 20 is a plan view of a feather drawing/storing-type water/wind turbine in the feather stored stage.
Figure 21:
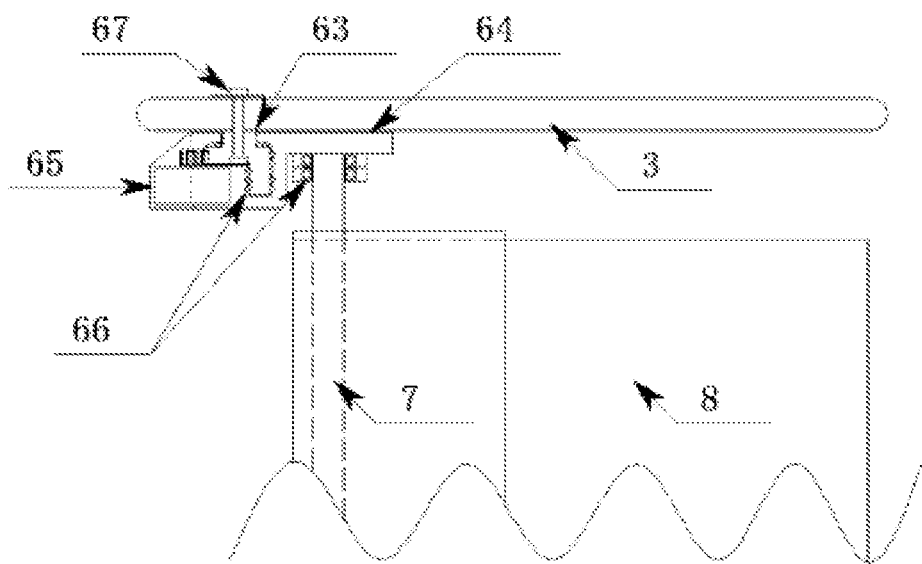
FIG. 21 is a detailed lateral view of a guide rail/guide table structure of a feather drawing/storing-type water/wind turbine.
Figure 22:
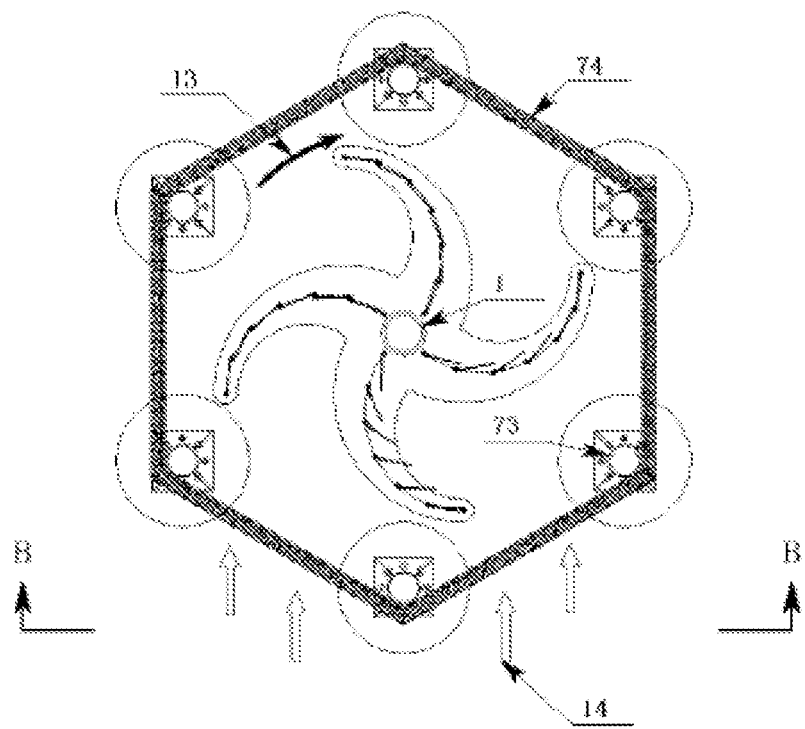
FIG. 22 is an A-A sectional view of a danger avoiding-type water/wind turbine before applying a mesh-patterned hanging screen, wherein the hanging screen is applied to a water/wind turbine, which is a mounted structure.
Figure 23:
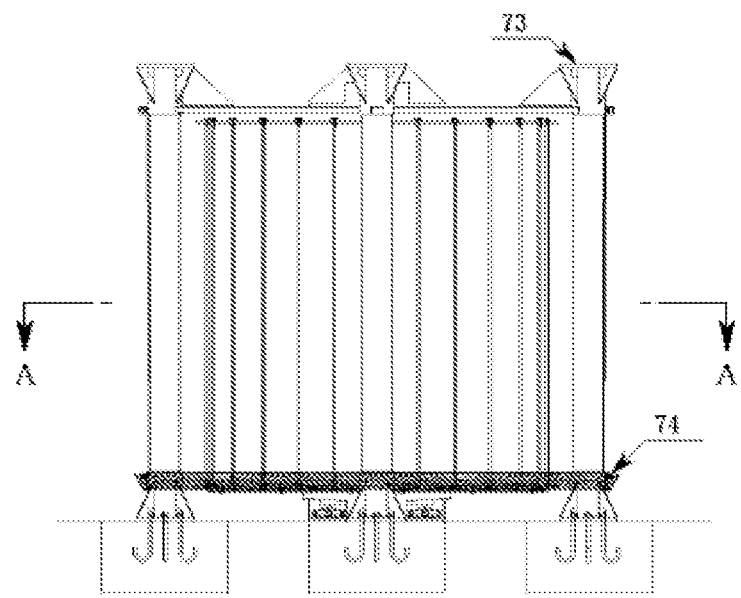
FIG. 23 is an B-B sectional view of a danger avoiding-type water/wind turbine before applying a mesh-patterned hanging screen, wherein the hanging screen is applied to a water/wind turbine, which is a mounted structure.
Figure 24:
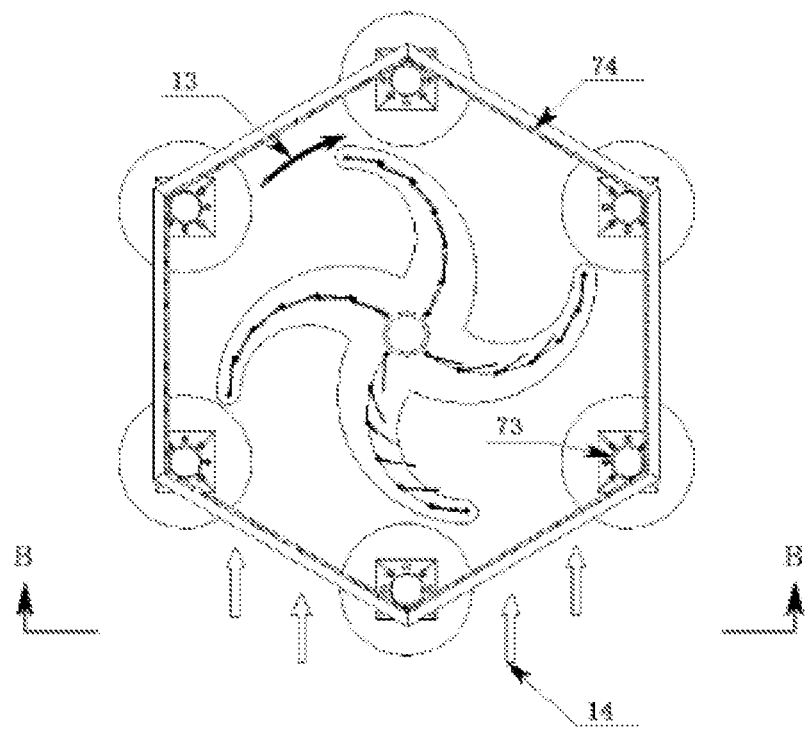
FIG. 24 is an A-A sectional view of a danger avoiding-type water/wind turbine after applying a mesh-patterned hanging screen, wherein the hanging screen is applied to a water/wind turbine, which is a mounted structure.
Figure 25:
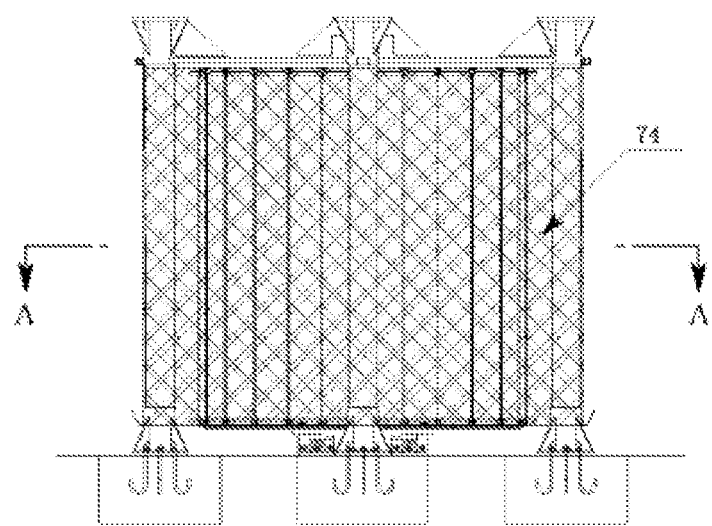
FIG. 25 is a B-B sectional view of a danger avoiding-type water/wind turbine after applying a mesh-patterned hanging screen, wherein the hanging screen is applied to a water/wind turbine, which is a mounted structure.

The expansion device has two fixing points, i.e., one point is on the rotation axis 1 side from a boundary formed by a support plate folding rotation axis, and the other point is fixed to a portion of a secondary support plate 39$b$ extending toward the rotation axis 1 side from a support plate folding rotation axis B 41$b$, i.e., the support plate to be folded toward the inner side of the arc of the wing line shape 4. The fixing point is fixed via a rotation function such as bearings. The mechanism is such that: a ball nut 45 is moved toward the tip end portion of a ball screw 46 by the rotary or expanding operation of the ball screw 46, which is rotated by power of a servomotor such as a ball screw driving motor 44; the secondary support plate 38$b$ connected to the ball nut 45 is pushed out, and the main body of the secondary support plate 38$b$ is folded toward the inner side of the arc of the wing line shape 4 centering on the support plate folding rotation axis B 41$b$ as a fulcrum. FIG. 12, FIG. 13 and FIG. 14 are explanatory views for a driving ball screw type when it is used as the expansion device for folding. Those three views are operation continuity views and show the position of the expansion device in each wing folding stage.

A primary support plate 37$b$ is folded by reversible rotational power of a motor 47 mounted on a support plate folding rotation axis A 40$b$, which is bordering on the secondary support plate 38$b$, or any other rotational power instrument.

Before starting the operation described in Paragraph 0078 above as well as before starting the operation described in Paragraph 0079, each related fastener, such as a sliding type fastener 42$b$ and a bobby pin, is slid to release fixing.

As the method of fixing the folded wing, the motor power of the ball screw driving motor 44 and the power of the motor 47 are employed, or it may be fixed by a cam device installed at the rotation part of another rotation tool. Alternatively, at a portion where the tip end portion of the primary support plate 37$b$ comes into contact with a support plate of an adjacent wing, the fixing may be achieved by hooking it with an uncinate object, putting a convex protrusion into it, or sandwiching it.

As one method for folding and fixing a drag-type water/wind turbine blade, a method of installing a gear slightly larger than the outer size of the rotation axis 1 may be employed at the center of the rotation axis 1, wherein the teeth of the gear are engaged with the teeth of a gear that is integrated into the base of the secondary support plate, and the folding and opening of the wing can be performed by the reversible rotation of the gear disposed at the center of the rotation axis.

A rotation center gear 52 is installed centering on the rotation axis 1, and a secondary support plate 38 equipped with a support plate opening/closing gear 48, which is a semi-circular gear to be engaged with the rotation center gear, is connected to a center support plate 39, which is installed at the center of the rotation axis 1, with a support plate folding rotation axis B 41, and the secondary support plate 38 is connected to a primary support plate 37 with a support plate folding rotation axis A 40.

The opening/closing and fixing of the blade during the operating time of the drag-type water/wind turbine described in Paragraph 0083 above is characterized in that among the support plates fixing both ends of the blade, the primary support plate 37 is fixed with the sliding type fastener 42, and the secondary support plate 38 is fixed by the force of the gear engaging with the rotation center gear 48. This fixing method does not necessarily exclude other methods including fixation by inserting a pin and engagement of a cam at a rotation part.

A splint for prop 54, which supports a primary support plate folding rotation prop 53 in order to help fold the primary support plate 37, is fixed to the rotation center gear 52 at its base in a rotatable state, and the tip end portion of the splint for prop 54 is fixed to the middle position of the primary support plate folding rotation prop 53 in a rotatable state.

The primary support plate folding rotation prop 53 has a rotation fulcrum fixing point at its base, which is coaxial with the support plate folding rotation axis B 41 or is a rotatable fixing point installed in its vicinity, and is supported by the splint for prop 54 at its middle point. The primary support plate folding rotation prop 53 is moved by the reciprocating motion of the splint for prop 54. The primary support plate folding rotation prop 53 is provided with a prop tip end sliding roller 55 at its tip end, wherein friction can be reduced at a time when the roller comes into contact with and slides along a support plate provided in an extended condition toward the rotation axis 1 side, in order to fold the primary support plate 37 centering on the support plate folding rotation axis A 40 as a fulcrum. Here, the prop tip end sliding roller 55 is preferably provided in order to reduce friction, but a highly-slidable special slippage resin or the like may be inserted to allow for sliding instead, wherein a material having high slidability should be used for reducing friction.

The primary support plate 37 provided in an extended condition toward the rotation axis 1 side so as to be folded centering on the support plate folding rotation axis A 40 as a fulcrum looks approximately like a dog-legged shape as seen from the axial direction of the rotation axis 1. This plays a role of a guide rail for the prop tip end roller 55, and its curved shape is made in consideration of timing, motion, etc. as described below. By the power of the center gear, the primary support plate 37 and the secondary support plate 38 are integrally folded in the support plate folding direction 58, and at the same time by the same power of the center gear, the splint for prop 54 is moved in the moving direction of splint for prop (at the time of folding) 60, and in conjunction therewith, the primary support plate folding rotation prop 53 pushed by the splint for prop is moved in the moving direction of primary support plate folding/rotating prop (at the time of folding) 61. As the next step, at a time when the primary support plate 37 with the sliding type fastener 42 released is folded as a single body in a tip-bending shape, the roller comes into contact with the dent of the dog-legged shape, and by the subsequent power in the rotation direction of rotation center gear (at the time of folding) 56, the primary support plate 37 and the secondary support plate 38 are each folded as a single body, wherein the tilting angle of the dog-legged shape is a tilting angle of the guide rail line after the dent of the "dog-legged" shape of the primary support plate 37 in order for the tip end portion of the primary support plate 37 to come closer to an adjacent support plate without touching it.

The power source for the movement of a drag-type water/wind turbine blade having a mechanism of opening/closing the blade by the center gear power may be a hollow motor power installed between the rotation center gear 52 and the rotation axis 1, a piston reciprocating motion power rotatively fixed and connected between a piston movable by oil pressure or the like and the rotation center gear 52, or a motor power source attached to a position where a geared motor installed on the center support plate 39 is engaged with the rotation center gear 52.

The folding movement of a drag-type water/wind turbine blade having a mechanism of opening/closing the blade by the center gear power is started by the rotation movement of the rotation center gear 52 in the rotation direction of rotation center gear (at the time of folding) 56.

The folding movement of the secondary support plate 38 is started by the movement of the support plate opening/closing gear 48 in the rotation direction of support plate opening/closing gear (at the time of folding) 57, wherein the support plate opening/closing gear is disposed at the base of the secondary support plate 38 in such a manner as to be engaged with the rotation center gear by the rotation of the gear in the rotation direction of rotation center gear (at the time of folding) 56. By the force, centering on the support plate folding rotation axis B 41 as a fulcrum, the secondary support plate 38 and primary support plate 37 on the circumferential edge side thereof are folded in the support plate folding direction 58.

Sometime after the folding of the primary support plate 37 and secondary support plate 38 as described in Paragraph 0090 above is started and before the prop tip end sliding roller 55 of the primary support plate folding rotation prop 53 comes into contact with the primary support plate 37, the sliding type fastener 42 fixed for fixing the secondary support plate 38 and the primary support plate 37 is moved in the moving direction of sliding type fastener (at the time of folding) 59 to be released.

By the rotation in the rotation direction of rotation center gear (at the time of folding) 56, the splint for prop 54 attached to the rotation center gear 52 is moved in the moving direction of splint for prop (at the time of folding) 60. The primary support plate folding rotation prop 53 pushed by the splint for prop 54 at its middle point is moved up in the moving direction of primary support plate folding/rotating prop (at the time of folding) 61 centering on the support plate folding rotation axis B 41 as a fulcrum. Since the primary support plate 37 being folded is bent centering on the support plate folding rotation axis A 40 as a fulcrum, a portion of the primary support plate 37 away from the support plate folding rotation axis 40 A toward the rotation axis 1 side comes to face the prop tip end sliding roller 55, which is attached to the tip end portion of the primary support plate folding rotation prop 53. By the force of further folding the support plate, the primary support plate 37 is folded centering on the support plate folding rotation axis B 41 as a fulcrum.

The position of the tip end portion of the splint for prop 54 fixed at the middle point of the primary support plate folding rotation prop 53 and the position of the same fixed to its base, i.e., the rotation center gear 52, and the lengths of the splint for prop 54 and the primary support plate folding rotation prop 53 are determined in view of the timing and positional relationship as described below. That is, the position and lengths are determined on the basis of the following timing: the primary support plate 37 and secondary support plate 38 integrally go along with the movement of the rotation direction of rotation center gear (at the time of folding) 56; the primary support plate folding rotation prop 53 moves in conjunction with the movement of the moving direction of splint for prop (at the time of folding) 60; at the next step, at a time when the primary support plate 37 with the sliding type fastener 42 released is folded as a single body, the roller comes into contact with the dent of the "dog-legged" shape; and the tip end portion of the primary support plate 37, which is being folded in a tip-bending shape, can come closer to an adjacent support plate without touching it The movement of folding a drag-type water/wind turbine blade having a mechanism of opening/closing the blade by the center gear power is illustrated as operation continuity views in FIG. 15, FIG. 16, FIG. 17 and FIG. 18 as seen from the top surface of the support plate.

As regards the movement of opening the blade by the center gear power, by the power of the rotation center gear 52 rotating in the direction opposite to the rotation direction of rotation center gear (at the time of folding) 56, the related gears are engaged with each other and brought back to an original state, and the blade is opened to a state during the operating time of the drag-type water/wind turbine. Accordingly, the present invention is characterized in that the major movement relating to the folding and opening of a blade is performed by the reversible rotation of the rotation center gear 52 disposed at the center of the water/wind turbine.

In order for the primary support plate 37 to be returned to a position where the blade is open, i.e. a state during the operating time, the following power is used: an opening/closing wound structure return spring 49 disposed at the position of the support plate folding rotation axis A 40; spring power of a coil spring 50 or the like connecting between the tip end portion of a secondary support plate connection reinforcement 62, which is the tip end portion of the secondary support plate 38, and the primary support plate 37; or rotation power of a motor or the like attached to the position of the support plate folding rotation axis A.

In the case of a drag-type water/wind wing folding system, as a preferable means for more assuredly avoiding a danger at the time of the occurrence of a disaster, the feather 8 attached to a wing on the most circumferential circle side is replaced with a vertical tail wing plate 43. The vertical tail wing plate 43 plays a role of a wall that protects the center of the water/wind turbine when the wing is folded while keeping conditions where the plate is temporarily fixed to the feather simple fixing axis 10.

The present invention is also characterized in that by providing a staged sequence in which folding movement is gradually performed in accordance with a gradual increase in the strength of fluid force in the middle of the folding movement for reducing the entire volume of a drag-type water/wind wing, energy can be recovered by operating a motor until the wing is folded/stored while controlling force in such a way as not to exceed the critical rotary force.

The basic structure for rotating a motor provided with a moving device for drawing the feathers 8 of a drag-type water/wind turbine wing and bringing them back to the original operating position and for avoiding a danger at the time of a strong wind, increased water flow speed or the like is characterized by the installation of a table-shaped object supporting both ends of the feather rotation axis 7 holding the feather 8 and an orbiting path that enables the table-shaped object to be moved.

The abovementioned movement can be achieved by moving upper and lower table-shaped objects, which are adjusted in such a manner that the feathers 8 and the feather rotation axes 7 held by the guide tables can be moved in parallel with the rotation axis 1, wherein the blade area is opened/closed by sliding, all feathers installed on drag-type blades to be rotated are drawn toward the rotation axis 1 side so as to significantly reduce the surface of receiving a fluid and thereby lose rotational force, and the resistance is reduced for the entire structure of the water/wind turbine as a result of decreasing the entire volume and fixing the blade, and thereby a danger at the time of a strong wind, increased water flow speed and the like can instantaneously be avoided.

The method of avoiding a danger at the time of a strong wind, increased water flow speed and the like for a motor provided with a moving device for the feathers 8 constituting a drag-type water/wind turbine wing is a method that cannot be performed unless the water/wind turbine motor has a structure in which one wing is constituted of an aggregate, wherein the feather rotation axis 7 attached with the feather 8 is one single unit.

The guide rail-type guide rail used as an orbiting path has a shape similar to a curved shape of the wing line shape 4, and the guide rail 63 is fixed to the support plate 3 at a position on the outer side of the arc of the wing line shape 4 so that the axial center of the feather rotation axis 7 can be on the line of the wing line shape 4 when it moves on the orbiting path, wherein the line is formed with a clearance in consideration of bearings 66 for rotation and fixing, the thickness of members such as the guide table 64 and the guide rail 63, the thickness of a clearance space between those members and the like.

Besides the method of installing the guide rail-type guide rail as described in Paragraph 0102 above, a ball screw-type axis or guide rail may be disposed on the support plate 3 just above the wing line shape 4, which is then processed to have a ball nut or a guide table (e.g., a ball nut holding a table), so that the feather rotation axis 7 can be supported on the ball screw-type axis or guide rail.

An installation mode in which a guide rail-type guide rail is installed on the line of the wing line shape 4 and the guide rail itself is used as a support body in place of the support plate 3 is also acceptable. In this case, a driving ball screw-type mobile axis (ball screw), which has frequently been used as an orbiting path just like a guide rail, may be installed as needed.

The material quality, thickness and axial diameter of a driving ball screw-type mobile axis or a guide rail-type guide rail, which is used as a support body in place of the support plate 3 as described in Paragraph 0104, are determined for its base portion, which is installed on the rotation axis 1, so as to have strength high enough not to be damaged by water force or wind force working on the entire wind-receiving area of the concave surface of a drag-type wing (material quality, thickness and axial diameter).

A ball nut (or a table combined with a ball nut) moving on a driving ball screw-type ball screw axis is moved by the reversible rotation power of a motor provided at the end portion of the ball nut, and the positioning is carried out by controlling the number of revolutions with a stepping motor or servomotor, which rotates for a fixed number on the basis of a signal sent, or by a method of installing a pointer at a stop position and stopping motion after detecting the pointer with a sensor.

The movement of a ball nut that moves on a driving ball screw-type ball screw axis is carried out by ball circulating-type reversible fluid force, as needed.

The movement of the guide table 64 that moves on the guide rail-type guide rail 63 is carried out by the reversible rotation power of a motor 65 embedded within the guide table 64, and the positioning is carried out by controlling the number of revolutions with a stepping motor or servomotor, which rotates for a fixed number on the basis of a signal sent, or by a method of installing a pointer at a stop position and stopping motion after detecting the pointer with a sensor.

In the case of avoiding a danger associated with high-speed rotation by the method of drawing the feathers 8, the feather 8 attached to a wing on the most circumferential circle side is replaced with a vertical tail wing plate 43. The vertical tail wing plate 43 is not only rotated toward the rotation axis 1 side by the reversible rotation power of a vertical tail wing plate-rotating motor 69 attached to the feather rotation axis 7 so as to press down the drawn feathers 8, but also rotated toward the feather simple fixing axis 10 side to be temporarily fixed at the time of restarting the water/wind turbine.

When a water/wind turbine motor is a mounted structure, as a method of decreasing the volume of a drag-type water/wind turbine wing or fixing a reduced-sized wing after decreasing the wing area by sliding, a support column 73 installed at a circumferential position of the main body is provided with a fork-shaped tool, the fork-shaped tool attached to the support column 73 is taken out after completing the reduction in the size of the water/wind turbine, and a bifurcated mouth, which is a socket of the forked tool, is put on the water/wind turbine and a support rod on the opposite side is fixed to the support column 73, which is installed outside the circumferential circle of the main body, as needed.

As a method of avoiding a danger at the time of a strong wind caused by an approaching typhoon after installing a water/wind turbine motor as a mounted structure, a mesh-patterned hanging screen 74 covering the lateral surface of the water/wind turbine motor is placed between the support columns 73 installed at circumferential positions of the main body. The mesh-patterned hanging screen 74 to be installed has a mesh size capable of weakening wind to such a level that the water/wind turbine is not destroyed by a strong wind passing through the mesh-patterned hanging screen 74 and coming inside at an expected fast speed of an expected strong wind, as a result of carefully surveying weather conditions in the region where the water/wind turbine is installed as well as previous weather records.

As a method of avoiding a danger at the time of a strong wind caused by an approaching typhoon after installing a water/wind turbine motor as a mounted structure, the mesh size is selected in such a manner that a smaller mesh is used when wind is strong as compared with when wind is weak. Moreover, as needed, energy can be recovered even at the time of a strong wind by selecting a mesh that allows wind to pass therethrough at a speed capable of operating the water/wind turbine.

As a method of avoiding a danger at the time of a strong wind caused by an approaching typhoon after installing a water/wind turbine motor as a mounted structure, two or more hanging screens each having a different mesh size are prepared, and the screens are installed in order of mesh size at the time of adopting measures to avoid a danger or are removed starting from a screen having a smaller mesh size, so that the wind-speed range in which a strong wind can be handled can be widened and the effect of increasing the amount of energy recovered for the water/wind turbine protected by the mesh-patterned hanging screens 74 can be achieved.

After installing a water/wind turbine motor, operational starting, adjustment and stopping by a method of avoiding a danger at the time of a strong wind caused by an approaching typhoon or the like may be performed by operating an electronic instrument, which is connected to an anemometer for measurement and detection and receives transmitted electronic signals, as needed.

When a vertical axis combined water/wind turbine motor according to the present invention is used as a water floating type, a wind turbine is mounted on a float and used as a motor for power generation, pumping-up or the like, and at a place where fluid energy can be generated by a river stream, a sea current or the like below the place where the float is mounted, a water turbine is installed below the surface so that larger amounts of work and power generation can be produced by the combined work of those turbines.

Although the method of installing and operating water floating type water/wind turbines above and below a float is used under site conditions that are significantly different, i.e., above water and underwater, the basic structure of drag-type blades is similar between them in many respects and the difference is only the place where feathers are mounted, and therefore the advantage is that maintenance can simply be carried out with a single component, i.e., management is easy.

In the propeller power generation system that is found in a horizontal axis type, propellers are higher than an iron tower, and therefore accidents occur that the propellers are struck by lightning and damaged, or a nacelle at the top part of an iron tower is struck by lightning and burned. In a vertical axis combined water/wind turbine motor, a lightning rod can be installed at the top part of the rotation axis 1 that is extended to a height higher than the main body, or at the top of a column on the circumferential side, which is installed for the purpose of fixing the main body, as needed, and measures to prevent a lightning accident can be adopted in such a manner that the entire vertical axis combined water/wind turbine motor is contained within a cone-shaped protecting angle, which is 60° on one side from the tip end of the installed lightning rod.

INDUSTRIAL APPLICABILITY

The depletion of various sources has recently been viewed as a problem, petroleum and coal that produce energy as major resources are resources under similar circumstances, and it is pointed out by many specialists that we will be in danger of scrambling for those scarcely available resources. Many technologically advanced countries have actively started promoting the use of renewable energy (solar energy, wind power energy, water power energy, geothermal energy, biomass energy) as alternative energy. The present invention relates to a motor capable of employing the force of fluids such as wind and water among them.

In view of technology, it has been said that the wind speed is relatively slow in Japan and the type of wind is mainly "wind blowing down mountains" and, therefore, is suitable for vertical axis wind turbine motors, but propeller-type wind power generators driven by horizontal axis-type lift have actually been employed in many cases. This is because the vertical axis type is low at revolution and poor at power generation efficiency and it is difficult to adopt measures to deal with typhoons, while the present invention enables to enhance startability by employing a combined type on the basis of conventional vertical axis wind power generation and can be used in the wind-speed area that is wider than that of other combined water/wind power generators because the rotation efficiency can be improved at high wind-speed and high water flow-speed areas. In addition, the present invention has the advantage that resistance can be reduced and highly efficient power generation can be achieved as compared with conventional motors in all of broad energy areas. Furthermore, the technological development is such that measures to handle disasters otherwise caused by typhoons can be adopted easily and quickly, and therefore the present invention can be employed as vertical axis water/wind power generators, which are suitable for the type of wind in Japan.

The "smart grid revolution" that is referred to as an energy revolution provided with "next-generation electric power networks" for all kinds of energy managed by the Internet has already begun, and it is expected that its revolutionary scale will achieve economic effects that can exceed those of the "IT revolution." This revolution has been carried out in order to smartly solve security problems (because stable acquisition of energy is desired) and the problem of production energy losses and has been attempting to significantly reduce losses by locally consuming locally-produced energy on the basis of a "small-scale decentralized system" in place of the present "large-scale centralized system." This revolution makes importance of conducting wind power generation at home and middle-scale wind farm power generation near each of small-scale areas using next-generation electric power networks in which consumers can easily become suppliers at a time when energy required for each small-scale area is acquired. Customers who will proceed with such a business revolution tend to look for home power generation with vertical axis water/wind turbines that can capture wind from all directions easily, and on a self-governing body scale, demands for wind farms using vertical axis wind turbines (it is said that the power generation per lot area is 100 times as much as that of horizontal axis wind turbines), which make large power generation possible on narrow sites, will inevitably increase all of a sudden.

EXPLANATION OF REFERENCE NUMERAL

1 Rotation axis
2 Center of circle
3 Support plate
4 Wing line shape
5 Wing line shape centered on Point A
6 Wing line shape centered on Point B
7 Feather rotation axis
8 Feather
9 Feather rolling-in length (L3)
10 Feather simple fixing axis
11 Feather rotation stopping axis
12 Feather temporary stopping metal fittings, etc.
13 Water/wind turbine rotation direction
13a Wind turbine rotation direction
13b Water turbine rotation direction
14 Water/wind flow
15 Wind flow
16 Water flow
17 All convex wings open
18 All concave wings closed
19 Circumferential circle
20 Internal vortex flow
21 Feather rotation range during wind turbine operating time
22 Feather rotation range during water turbine operating time
23 Feather rotation range at the time of avoiding danger to wind turbine
24 Feather rotation range at the time of avoiding danger to water turbine
25 Feather rolling-in cylinder
26 Feather rotation axis interval (L1)
27 Length in short direction (lateral direction) of feather during operating time (L2)

28 Length in short direction of feather at the time of avoiding danger (L2-L3)
29 Drag-type blade
30 Rotation direction of drag-type blade
31 Lift-type blade
32 Rotation direction of lift-type blade
33 Rotation direction of vertical axis combined water/wind turbine motor
34 Drag-type wing concave surface when receiving wind
35 Drag-type convex surface released
36 All drag-type wings open
37 Primary support plate
37a Primary support plate
38 Secondary support plate
38b Secondary support plate
39 Center support plate
39b Center support plate
40 Support plate folding rotation axis A
40b Support plate folding rotation axis A
41 Support plate folding rotation axis B
41b Support plate folding rotation axis B
42 Sliding type fastener
42b Sliding type fastener
43 Vertical tail wing plate
43b Vertical tail wing plate
44 Ball screw driving motor
45 Ball nut
46 Ball screw
47 Motor
48 Support plate opening/closing gear
49 Opening/closing wound structure return spring
50 Coil spring
51 Rotation center gear power
52 Rotation center gear
53 Primary support plate folding rotation prop
54 Splint for prop
55 Prop tip end sliding roller
56 Rotation direction of rotation center gear (at the time of folding)
57 Rotation direction of support plate opening/closing gear (at the time of folding)
58 Support plate folding direction
59 Moving direction of sliding type fastener (at the time of folding)
60 Moving direction of splint for prop (at the time of folding)
61 Moving direction of primary support plate folding rotation prop (at the time of folding)
62 Secondary support plate connection reinforcement
63 Guide rail
64 Guide table
65 Motor
66 Bearings
67 Guide rail fixing bolt
68 Vertical tail wing plate with rotation device
69 Vertical tail wing plate-rotating motor
70 Support column for support plates
71 Feather drawing/storing direction
72 Rotation direction of vertical tail wing plate for pressing feathers
73 Support column
74 Mesh-patterned hanging screen

What is claimed is:

1. A vertical axis drag type complex water-wind turbine comprises:
a vertical axis drag type water-wind turbine placed at a center of a rotational axis of the vertical axis drag type complex water-wind turbine, and
a vertical axis lift type water-wind turbine placed at a rotating external circumference of the rotational axis where each of the drag and the lift type turbines has two or more fliers on a rotating object, the vertical axis drag type water-wind turbine and the vertical axis lift type water-wind turbine being integrated by having the rotational directions by water and wind be the same,
a wing of the vertical axis drag type water-wind turbine comprises:
a flier rotational shaft at boundaries of three or more divided segments of an arc connecting a center of a rotational axis of the vertical axis drag type water-wind turbine and a circumferential circle of the vertical axis drag type water-wind turbine,
support plates provided at two axial ends of the flier rotational shaft that fix the two axial ends of the flier rotational shaft, and
fliers each having a longitudinal side attached to the flier rotational shaft, the fliers freely rotate individually in a sector between two adjacent flier rotational shafts,
wherein after the vertical axis drag type complex water-wind turbine starts operation, in the rotational acceleration stage, the rotational efficiency is maintained by the fluid resistance reduced by opening the fliers that have drag wing surfaces in all rotational directions where the rotational acceleration of the vertical axis drag type complex water-wind turbine causes a forced rational motion in which the rotational acceleration due to the lift wing pulling the central drag wing; the opening of the fliers that have the drag wing surfaces in all rotational directions guides a streamline flow unimpeded by the drag wing surface located at the center of the water-wind turbine so that the rotational acceleration increases when the flow passed the downstream of the water-wind turbine of the lift wing surfaces.

2. The vertical axis drag type complex water-wind turbine of claim 1, wherein the support plates which fix the two axial ends of the fliers have bended segments divided and connected with junctions as supporting points, and with the folding direction set to be the inner arc connecting the center of the rotational axis of the vertical axis drag type water-wind turbine and the circumferential circle of the vertical axis drag type water-wind turbine in the horizontal direction of the support plates, the wing surface configured with the fliers supported by the support plates is folded inward the arc, where the folded line of the wing surface is approximately parallel to the rotational axis, the folding segments of the wing surface are two or more segments in the arc connecting the center of the rotational axis of the vertical axis drag type water-wind turbine and the circumferential circle of the vertical axis drag type water-wind turbine, and the folding action reduces the rotational force to avoid potential danger caused by high-speed fluid by decreasing the projected area of the fluid for reducing the resistance, whereas in a fluid speed environment where the lift type wing surface is operated continuously, the rotational efficiency is improved by folding segments of the wing surface reduces the drag type wing surface at the center of the water-wind turbine rotation, guiding a streamline flow unimpeded by the drag wing surface located at the center of the water-wind turbine so that the rotational acceleration increases when the flow passed the downstream of the water-wind turbine of the lift wing surfaces.

3. The vertical axis drag type complex water-wind turbine of claim 2, wherein a rotation center gear having a central hollow part through which the rotational axis passes and a gear for opening and closing support plates, located at a side end of the rotational axis, are engaged through a support plate folding rotational axis for a next line support plate so that the positive and negative rotational directions of the rotation center gear may inter-connectedly fold and turn the support plate as series of folding and returning motions: for folding two or more segments of a support plate, one end of a furring strip for support rod is connected with the rotation center gear, the other end is connected with the midpoint of a rotation support rod for folding the first line support plate as a pivot; one end of the rotation support rod for folding the first line support plate is connected with the rotation axis for folding the support plate as a pivot; the furring strip for support rod pushed out by the motion of the rotation center gear in the rotational direction of rotation center gear when folding raises the rotation support rod for folding the first line support plate on the side of the support plate folded by the gear rotation, making contact the leading edge of the rotation support rod for folding first line support plate with part of the rotational axis on the side of the rotational axis for folding the first line support plate; and the following continuously motion of the gear for folding the support plate folds the first line support plate around the rotational axis for folding the support plate; whereas turning the support plate to the initial condition upon stating operation, taking the reverse action of the aforementioned motion due to the rotation of the rotation center gear reverse to the aforementioned rotation.

4. The vertical axis drag type complex water-wind turbine of claim 2, wherein a pole screw driving motor is fixed on a center support plate of the segmented support plates provided at two axial ends of the rotational axis, and a pole nut, which is fixed as a pivot at the end of the rotational axis on the side of the rotational axis for folding a next line support plate, moves on the pole screw rotating with the pole screw driving motor for folding and returning the segmented plates using positive and negative rotational forces of the pole screw driving motor.

5. The vertical axis drag type complex water-wind turbine of claim 1, wherein the wing of the vertical axis drag type water-wind turbine is configured to move individually in a standing geometrical shape that comprises the fliers with the flier rotational shaft, and vertical axis drag type water-wind turbine comprises a guide table for supports of the upper and lower ends of the flier rotational shaft, and a guide rail for moving the supports along the approximately orbital shape of the arc of a wing line shape, where the fliers are attracted-toward the rotational axis until the supports come in contact with each other as each of the integrated bodies translates to the side of the rotational axis or along the outer circumference passing on the orbit of the guiderail that is fixed to the support, and the retractable and foldable fliers are attracted to the rotational axis until the supports come in contact with each other to reduce the fluid receiving area substantially and the fluid-receiving purpose in order to avoid potential danger caused by high-speed fluid, whereas in a fluid speed environment where the lift type wing surface may be operated continuously, the rotational efficiency may be improved by attracting the fliers of the water-wind turbine to the rotational axis that may guide a streamline flow unimpeded by the drag wing surface located at the center of the water-wind turbine so that the rotational acceleration increases when the fluid flow passed the downstream of the water-wind turbine of the lift wing surfaces.

6. The vertical axis drag type complex water-wind turbine of claim 1, wherein part of the fliers in the vicinity of a flier rotational axis of the drag type wing of the vertical axis drag type complex water-wind turbine is wound onto the flier rotational axis or attracted to the rotational axis, and when the water-wind turbine reaches a dangerous rotational speed, using a material of high tensile strength to reduce the horizontal lengths of the fliers to shorter than the distance between adjacent flier rotational axes so that the fliers are freely rotatable by 360° around the flier rotational shaft for flapping all fliers in the fluid to avoid a potential danger caused by a high-speed fluid by flapping all fliers in the fluid so that the fluid resistance is reduced.

7. A vertical axis drag type water-wind turbine comprising:
    a vertical axis that comprises rotationally symmetric arched arc wings around a rotational axis,
    a flier rotational axis at the boundaries of three or more divided segments of the arc connecting a center of a rotational axis of the vertical axis drag type water-wind turbine and a circumferential circle of the vertical axis drag type water-wind turbine and a support provided at two axial ends of the rotational axis and fixes both ends of the rotational axis, and
    fliers each having a longitudinal side attached to a flier rotational shaft, the flier rotational shaft defining along the flier rotational axis, the fliers freely rotate individually in a sector between two adjacent flier rotational shafts, forming a pair of wings with the flier and the flier rotational axis perpendicular to the arc connecting the center of the rotational axis of the vertical axis drag type water-wind turbine and the circumferential circle of the vertical axis drag type water-wind turbine on one side of the rotational axis, and when the wing against the fluid becomes convex, the fliers open, whereas, when the wing is concave while the wind turbine is being used, the fliers are lined up against the wind flow to close the space between the flier rotational shafts by wind flowing into the inner arc region of the arc connecting the center of the rotational axis of the vertical axis drag type water-wind turbine and the circumferential circle of the vertical axis drag type water-wind turbine before the wing becomes concave by receiving wind, and when the water turbine is used, synchronizing with the rotation of the wing, the fliers form a water receiving surface by gradually closing the space between the flier rotational shafts from the flier rotational shafts along the arc following the water flow, and obtaining rotational force from the water flow upon impacting the water-receiving surface and rotation around the rotational axis, and two or more pairs of wings are configured rotationally symmetric to achieve rotations of reduced rotational resistance by automatically opening and closing the fliers, where the supports have bended segments whose junction points of connecting divided segments are the supporting points, the folding direction is set to be the inner side of the arc connecting the center of the rotational axis of the vertical axis drag type water-wind turbine and the circumferential circle of the vertical axis drag type water-wind turbine in the horizontal direction of the support, along which the wing surface configured with the fliers, which are supported by the support, is folded to the inward side of the arc, where the folded line of the wing surface is approximately parallel to the rotational axis, the folding segment of the wing surface is two or more segments in the arc of the wing line shape, and the folding action loses the rotational force by losing the fluid-receiving purpose to avoid potential danger when a high-speed fluid appears by decreasing the projected area of the fluid for resistance reduction.

8. The vertical axis drag type water-wind turbine of claim 7, wherein a rotation center gear having a central hollow part through which the rotational axis passes and a gear for opening and closing support plates, located at a side end of the rotational axis, are engaged through a support plate folding rotational axis for a next line support plate so that the positive and negative rotational directions of the rotation center gear may inter-connectedly fold and turn the support plate as series of folding and returning motions: for folding two or more segments of a support plate, one end of a furring strip for support rod is connected with the rotation center gear, the other end is connected with the midpoint of a rotation support rod for folding the first line support plate as a pivot; one end of the rotation support rod for folding the first line support plate is connected with the rotational axis for folding the support plate as a pivot; the furring strip for support rod pushed out by the motion of the rotation center gear in the rotational direction of rotation center gear when folding raises the rotation support rod for folding the first line support plate on the side of the support plate folded by the gear rotation, making contact the leading edge of the rotation support rod for folding first line support plate with part of the rotational axis on the side of the rotational axis for folding the first line support plate; and the following continuously motion of the gear for folding the support plate folds the first line support plate around the rotational axis for folding the support plate; whereas turning the support plate to the initial condition upon stating operation, taking the reverse action of the aforementioned motion due to the rotation of the rotation center gear reverse to the aforementioned rotation.

9. The vertical axis drag type water-wind turbine of claim 7, wherein a pole screw driving motor is fixed on a center support plate of the segmented support plates provided at two axial ends of the rotational axis, and a pole nut, which is fixed as a pivot at the end of the rotational axis on the side of the rotational axis for folding a next line support plate, moves on the pole screw rotating with the pole screw driving motor for folding and returning the segmented plates using positive and negative rotational forces of the pole screw driving motor.

10. A vertical axis drag type water-wind turbine comprises:
a vertical axis that comprises rotationally symmetric arched arc wings around a rotational axis of the vertical axis drag type water-wind turbine, and
a flier rotational shaft at the boundaries of or more divided segments of the arc connecting a center of a rotational axis of the vertical axis drag type water-wind turbine and a circumferential circle of the vertical axis drag type water-wind turbine, and
a support provided at two axial ends of the rotational axis and fixes both ends of the rotational axis, and
fliers each having a longitudinal side attached to the flier rotational shaft, the fliers freely rotate individually in a sector between two adjacent flier rotational shaft, forming a pair of wing with the flier and a flier rotational axis perpendicular to the arc connecting the center of the rotational axis of the vertical axis drag type water-wind turbine and the circumferential circle of the vertical axis drag type water-wind turbine on one side of the rotational axis, and when the wing against the fluid is convex, the fliers open whereas when the wing is concave while the wind turbine is being used the fliers are lined up against the wind flow to close the space between the flier rotational shafts by wind flowing into the inner arc region of the arc connecting the center of the rotational axis of the vertical axis drag type water-wind turbine and the circumferential circle of the vertical axis drag type water-wind turbine before the wing becomes concave by receiving a wind, and when the water turbine is used, synchronizing with the rotation of the wing, the fliers form a water receiving surface by gradually closing the space between the flier rotational shafts from the rotational axis along the arc following the water flow, and obtaining rotational force from the water flow hitting the water-receiving surface and rotation around the rotational axis, and two or more pairs of wings are configured rotationally symmetrical to achieve rotations of reduced rotational resistance by automatically opening and closing the fliers, where the vertical axis drag type water-wind turbine is configured to move individually in a standing geometrical shape that comprises the fliers with the flier rotational shaft, and the vertical axis drag type water-wind turbine comprises a guide table for supports of upper and lower ends of the flier rotational shaft, and a guide rail for moving the supports along the orbital shape of approximately arc shape of a wing line shape, where the fliers is attracted toward the rotational axis until the supports come in contact with each other as each of the integrated bodies translates to the side of the rotational axis and the outer circumference passing on the orbit of the guiderail that is fixed to the support, and the retractable and foldable fliers until the supports come in contact with each other are attracted to the rotational axis to reduce the fluid receiving area substantially and the fluid-receiving purpose to avoid potential danger caused by a high-speed fluid.

* * * * *